(12) United States Patent
Sharifi et al.

(10) Patent No.: US 12,147,470 B2
(45) Date of Patent: Nov. 19, 2024

(54) HANDLING CONTRADICTORY QUERIES ON A SHARED DEVICE

(71) Applicant: Google LLC

(72) Inventors: Matthew Sharifi, Kilchberg (CH); Victor Carbune, Zürich (CH)

(73) Assignee: Google LLC, Mountain View, CA (US)

( * ) Notice: Subject to any disclaimer, the term of this patent is extended or adjusted under 35 U.S.C. 154(b) by 114 days.

(21) Appl. No.: 17/938,455

(22) Filed: Oct. 6, 2022

(65) Prior Publication Data
US 2024/0119088 A1 Apr. 11, 2024

(51) Int. Cl.
| | | |
|---|---|---|
| G06F 16/632 | (2019.01) | |
| G06F 16/638 | (2019.01) | |
| G10L 17/02 | (2013.01) | |
| G10L 17/06 | (2013.01) | |

(52) U.S. Cl.
CPC .......... *G06F 16/632* (2019.01); *G06F 16/639* (2019.01); *G10L 17/02* (2013.01); *G10L 17/06* (2013.01)

(58) Field of Classification Search
CPC .............................. G06F 16/632; G06F 16/639
See application file for complete search history.

(56) References Cited

U.S. PATENT DOCUMENTS

| | | | |
|---|---|---|---|
| 11,636,291 B1* | 4/2023 | Zuo .................. | G06F 18/24147 382/159 |
| 2017/0242657 A1 | 8/2017 | Jarvis et al. | |
| 2018/0365695 A1* | 12/2018 | Liu ......................... | G06F 18/22 |
| 2020/0058308 A1 | 2/2020 | Choi et al. | |
| 2020/0177410 A1* | 6/2020 | Iyengar ................... | G06F 3/167 |
| 2022/0189465 A1 | 6/2022 | Sharifi et al. | |

OTHER PUBLICATIONS

Nurgaliyev, Kenzhegali, et al. "Improved multi-user interaction in a smart environment through a preference-based conflict resolution virtual assistant." 2017 International Conference on Intelligent Environments (IE). IEEE, 2017. (Year: 2017).*
Ospan, Bauyrzhan, et al. "Context aware virtual assistant with case-based conflict resolution in multi-user smart home environment." 2018 international conference on computing and network communications (coconet). IEEE, 2018. (Year: 2018).*
International Search Report and Written Opinion issued in related PCT Application No. PCT/US2023/034362, dated Feb. 28, 2024.

* cited by examiner

*Primary Examiner* — Jay A Morrison
(74) *Attorney, Agent, or Firm* — Honigman LLP; Brett A. Krueger; Grant Griffith

(57) ABSTRACT

A method for handling contradictory queries on a shared device includes receiving a first query issued by a first user, the first query specifying a first long-standing operation for a digital assistant to perform, and while the digital assistant is performing the first long-standing operation, receiving a second query, the second query specifying a second long-standing operation for the digital assistant to perform. The method also includes determining that the second query was issued by another user different than the first user and determining, using a query resolver, that performing the second long-standing operation would conflict with the first long-standing operation. The method further includes identifying one or more compromise operations for the digital assistant to perform, and instructing the digital assistant to perform a selected compromise operation among the identified one or more compromise operations.

26 Claims, 11 Drawing Sheets

HANDLING CONTRADICTORY QUERIES ON A SHARED DEVICE

TECHNICAL FIELD

This disclosure relates to handling contradictory queries on a shared device.

BACKGROUND

A user's manner of interacting with an assistant-enabled device is designed primarily, if not exclusively, by means of voice input. For example, a user may ask a device to perform an action including media playback (e.g., music or podcasts), where the device responds by initiating playback of audio that matches the user's criteria. In instances where a device (e.g., a smart speaker) is commonly shared by multiple users in an environment, the device may need to field multiple actions requested by the users that may compete with one another.

SUMMARY

One aspect of the disclosure provides a computer-implemented method that when executed on data processing hardware causes the data processing hardware to perform operations that include receiving a first query issued by a first user, the first query specifying a first long-standing operation for a digital assistant to perform. While the digital assistant is performing the first long-standing operation, the operations also include receiving a second query, the second query specifying a second long-standing operation for the digital assistant to perform, and determining that the second query was issued by another user different than the first user. Based on determining that the second query was received from the other user, the operations also include determining, using a query resolver, that performing the second long-standing operation would conflict with the first long-standing operation, and based on determining that performing the second long-standing operation would conflict with the first long-standing operation, identifying one or more compromise operations for the digital assistant to perform. The operations further include instructing the digital assistant to perform a selected compromise operation among the identified one or more compromise operations.

Implementations of the disclosure may include one or more of the following optional features. In some implementations, receiving the second query includes receiving audio data corresponding to the second query, the second query spoken by the other user and captured by an assistant-enabled device executing the digital assistant, and determining that the second query was issued by another user that is different than the first user includes performing speaker identification on the audio data to determine that the second query was spoken by the other user that is different than the first user that issued the query. In these implementations, performing speaker identification on the audio data to determine that the second query was spoken by the other user includes extracting, from the audio data corresponding to the second query, a speaker-discriminative vector representing characteristics of the second query, and determining that the speaker-discriminative vector extracted from the audio data corresponding to the second query at least one of does not match a reference speaker vector for the first user or matches an enrolled speaker vector associated with the other user. In some examples, receiving the first query issued by the first user includes receiving, from a user device associated with the first user, a user input indication indicating a user intent to issue the first query. Additionally or alternatively, receiving the first query issued by the first user comprises receiving audio data corresponding to the first query spoken by the first user and captured by an assistant-enabled device executing the digital assistant.

In some implementations, identifying the one or more compromise operations for the digital assistant to perform includes identifying criteria associated with the first query, identifying criteria associated with the second query, generating, using a query embedding model, a first query embedding based on the criteria associated with the first query and a second query embedding based on the criteria associated with the second query. The operations also include determining a combined embedding based on the first query embedding and the second query embedding, and identifying at least one compromise operation that maps to the combined embedding in an embedding space. In these implementations, the identified criteria associated with the first query may include a first preference of a type of media content for playback from an assistant-enabled device executing the digital assistant, the identified criteria associated with the second query may include a second preference of the type of the media content for playback from the assistant-enabled device, and the identified at least one compromise operation may include a third preference of the type of media content for playback from the assistant-enabled device. Additionally, the type of media content may include music, where the first preference of the type of the media content includes a first genre of music, and the second preference of the type of the media content includes a second genre of music. Alternatively, the identified criteria associated with the first query includes a first value for a setting of a home automation device, the identified criteria associated with the second query includes a second value for the setting of the home automation device, and the identified at least one compromise operation includes adjusting the first value for the setting of the home automation device to a new value. Here, the home automation device may include a smart thermostat, a smart light, a smart speaker, or a smart display.

In some examples, the operations further include obtaining a home graph indicating at least two assistant-enabled devices within a same environment as the first user and the other user and capable of performing the first long-standing operation and the second long-standing operation. Here, identifying the one or more compromise operations for the digital assistant to perform includes identifying a first assistant-enabled device from the home graph as a candidate for the digital assistant to perform the first long-standing operation and identifying a second assistant-enabled device from the home graph as a candidate for the digital assistant to perform the second long-standing operation simultaneously while the digital assistant performs the long-standing operation on the first assistant-enabled device. In these examples, the operations may further include obtaining, from the home graph, proximity information for each of the at least two AEDs within the same environment as the first user and the other user, and obtaining proximity information for each of the first user that issued the first query and the other user that issued the second query. In these examples, identifying the first assistant-enabled device from the home graph as the candidate for the digital assistant to perform the first long-standing operation and identifying the second assistant-enabled device from the home graph as the candidate for the digital assistant to perform the second long-standing operation simultaneously is based on the proximity information for each of the at least two AEDs and the proximity information for each of the first user and the other user.

In some implementations, the digital assistant performs the first long-standing operation on a first assistant-enabled device; and instructing the digital assistant to perform the selected compromise operation includes instructing the digital assistant to perform the second long-standing operation on a second assistant-enabled device simultaneously while the digital assistant is performing the first long-standing operation on the first assistant-enabled device. In these examples, after instructing the digital assistant to perform the second long-standing operation on the second assistant-enabled device, the operations may further include instructing the digital assistant to adjust performance of the first long-standing operation on the first assistant-enabled device. In some implementations, when multiple compromise operations for the digital assistant to perform are identified, the operations further include determining a respective score associated with each compromise operation among the multiple compromise operations, and selecting the compromise operation among the multiple compromise operations as the compromise operation having the highest respective score. In these implementations, the operations may further include determining that the respective score associated with the selected compromise operation satisfies a threshold. Here, instructing the digital assistant to perform the compromise operation is based on the respective score associated with the selected compromise operation satisfying the threshold. In some examples, the operations further include prompting the first user and/or the other user to provide confirmation for the digital assistant to perform the selected compromise operation, and receiving positive confirmation from the first user and/or the other user for the digital assistant to perform the selected compromise operation, and where instructing the digital assistant to perform the selected compromise operation is based on the received positive confirmation.

Another aspect of the disclosure provides a system including data processing hardware and memory hardware in communication with the data processing hardware. The memory hardware stores instructions that when executed by the data processing hardware cause the data processing hardware to perform operations that include receiving a first query issued by a first user, the first query specifying a first long-standing operation for a digital assistant to perform. While the digital assistant is performing the first long-standing operation, the operations also include receiving a second query, the second query specifying a second long-standing operation for the digital assistant to perform, and determining that the second query was issued by another user different than the first user. Based on determining that the second query was received from the other user, the operations also include determining, using a query resolver, that performing the second long-standing operation would conflict with the first long-standing operation, and based on determining that performing the second long-standing operation would conflict with the first long-standing operation, identifying one or more compromise operations for the digital assistant to perform. The operations further include instructing the digital assistant to perform a selected compromise operation among the identified one or more compromise operations.

This aspect may include one or more of the following optional features. In some implementations, receiving the second query includes receiving audio data corresponding to the second query, the second query spoken by the other user and captured by an assistant-enabled device executing the digital assistant, and determining that the second query was issued by another user that is different than the first user includes performing speaker identification on the audio data to determine that the second query was spoken by the other user that is different than the first user that issued the query. In these implementations, performing speaker identification on the audio data to determine that the second query was spoken by the other user includes extracting, from the audio data corresponding to the second query, a speaker-discriminative vector representing characteristics of the second query, and determining that the speaker-discriminative vector extracted from the audio data corresponding to the second query at least one of does not match a reference speaker vector for the first user or matches an enrolled speaker vector associated with the other user. In some examples, receiving the first query issued by the first user includes receiving, from a user device associated with the first user, a user input indication indicating a user intent to issue the first query. Additionally or alternatively, receiving the first query issued by the first user comprises receiving audio data corresponding to the first query spoken by the first user and captured by an assistant-enabled device executing the digital assistant.

In some implementations, identifying the one or more compromise operations for the digital assistant to perform includes identifying criteria associated with the first query, identifying criteria associated with the second query, generating, using a query embedding model, a first query embedding based on the criteria associated with the first query and a second query embedding based on the criteria associated with the second query. The operations also include determining a combined embedding based on the first query embedding and the second query embedding, and identifying at least one compromise operation that maps to the combined embedding in an embedding space. In these implementations, the identified criteria associated with the first query may include a first preference of a type of media content for playback from an assistant-enabled device executing the digital assistant, the identified criteria associated with the second query may include a second preference of the type of the media content for playback from the assistant-enabled device, and the identified at least one compromise operation may include a third preference of the type of media content for playback from the assistant-enabled device. Additionally, the type of media content may include music, where the first preference of the type of the media content includes a first genre of music, and the second preference of the type of the media content includes a second genre of music. Alternatively, the identified criteria associated with the first query includes a first value for a setting of a home automation device, the identified criteria associated with the second query includes a second value for the setting of the home automation device, and the identified at least one compromise operation includes adjusting the first value for the setting of the home automation device to a new value. Here, the home automation device may include a smart thermostat, a smart light, a smart speaker, or a smart display.

In some examples, the operations further include obtaining a home graph indicating at least two assistant-enabled devices within a same environment as the first user and the other user and capable of performing the first long-standing operation and the second long-standing operation. Here, identifying the one or more compromise operations for the digital assistant to perform includes identifying a first assistant-enabled device from the home graph as a candidate for the digital assistant to perform the first long-standing operation and identifying a second assistant-enabled device from the home graph as a candidate for the digital assistant to perform the second long-standing operation simultaneously while the digital assistant performs the long-standing operation on the first assistant-enabled device. In these examples, the operations may further include obtaining, from the home graph, proximity information for each of the at least two AEDs within the same environment as the first user and the other user, and obtaining proximity information for each of the first user that issued the first query and the other user that issued the second query. In these examples, identifying the first assistant-enabled device from the home graph as the candidate for the digital assistant to perform the first long-standing operation and identifying the second assistant-enabled device from the home graph as the candidate for the digital assistant to perform the second long-standing operation simultaneously is based on the proximity information for each of the at least two AEDs and the proximity information for each of the first user and the other user.

In some implementations, the digital assistant performs the first long-standing operation on a first assistant-enabled device; and instructing the digital assistant to perform the selected compromise operation includes instructing the digital assistant to perform the second long-standing operation on a second assistant-enabled device simultaneously while the digital assistant is performing the first long-standing operation on the first assistant-enabled device. In these examples, after instructing the digital assistant to perform the second long-standing operation on the second assistant-enabled device, the operations may further include instructing the digital assistant to adjust performance of the first long-standing operation on the first assistant-enabled device. In some implementations, when multiple compromise operations for the digital assistant to perform are identified, the operations further include determining a respective score associated with each compromise operation among the multiple compromise operations, and selecting the compromise operation among the multiple compromise operations as the compromise operation having the highest respective score. In these implementations, the operations may further include determining that the respective score associated with the selected compromise operation satisfies a threshold. Here, instructing the digital assistant to perform the compromise operation is based on the respective score associated with the selected compromise operation satisfying the threshold. In some examples, the operations further include prompting the first user and/or the other user to provide confirmation for the digital assistant to perform the selected compromise operation, and receiving positive confirmation from the first user and/or the other user for the digital assistant to perform the selected compromise operation, and where instructing the digital assistant to perform the selected compromise operation is based on the received positive confirmation.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A user's manner of interacting with an assistant-enabled device is designed primarily, if not exclusively, by means of voice input. For example, a user may ask a device to perform an action including media playback (e.g., music or podcasts), where the device responds by initiating playback of audio that matches the user's criteria. In instances where a device (e.g., a smart speaker) is commonly shared by multiple users in an environment, the device may need to field multiple actions requested by the users that may compete with one another. In cases where one or more of the multiple users issue multiple individual requests of the device, subsequent requests may override an existing operation being performed by the device. Rather than overriding the previous request, the device may attempt to offer a compromise to the multiple users that is inclusive of the preferences of each of the multiple users. By ensuring that each user in the environment has been considered, the frequency at which requests are unnecessarily overwritten without the initiating user's consent is decreased.

In addition to controlling the actions of playing music to accommodate conflicting requests, the device may control other types of media such as podcasts and videos, as well as home automation such as adjusting light levels, controlling the air conditioning level, etc. Similarly, the device may prevent another user from overwriting an initial user's request by identifying compromises and prompting the users to sign off on the compromise before overwriting the initial user's request. This saves computational resources for processing conflicting requests, as well as the initial user's time needed to reinstate the original request when it is overwritten without consent. This additionally may extend into controlling aspects of a home connected to the device. For example, a host of a party may set the lighting levels during a party to ensure a soothing atmosphere. The host may speak "set the lights to 60%." For a duration of the party, the device may prevent or limit the extent to which other attendees at the party can adjust the lighting levels by incorporating lighting requests from the attendees into a compromise the host can agree to or decline.

The device may additionally operate to resolve conflicts between individuals present in a home. For example, the device may help individuals in an environment create a shopping list, thereby ensuring any conflicting items are resolved by offering a compromise to the individuals to add items to the shopping list. For instance, the device may recommend an item to add to a shopping list in response to two individual requests that conflict or are similar enough to combine. Similarly, the device may proactively mediate disagreements between individuals. For example, the device may engage/prompt individuals with conflicting views with a compromise that suits both individuals, thereby resolving the disagreement.

Figure 1A:
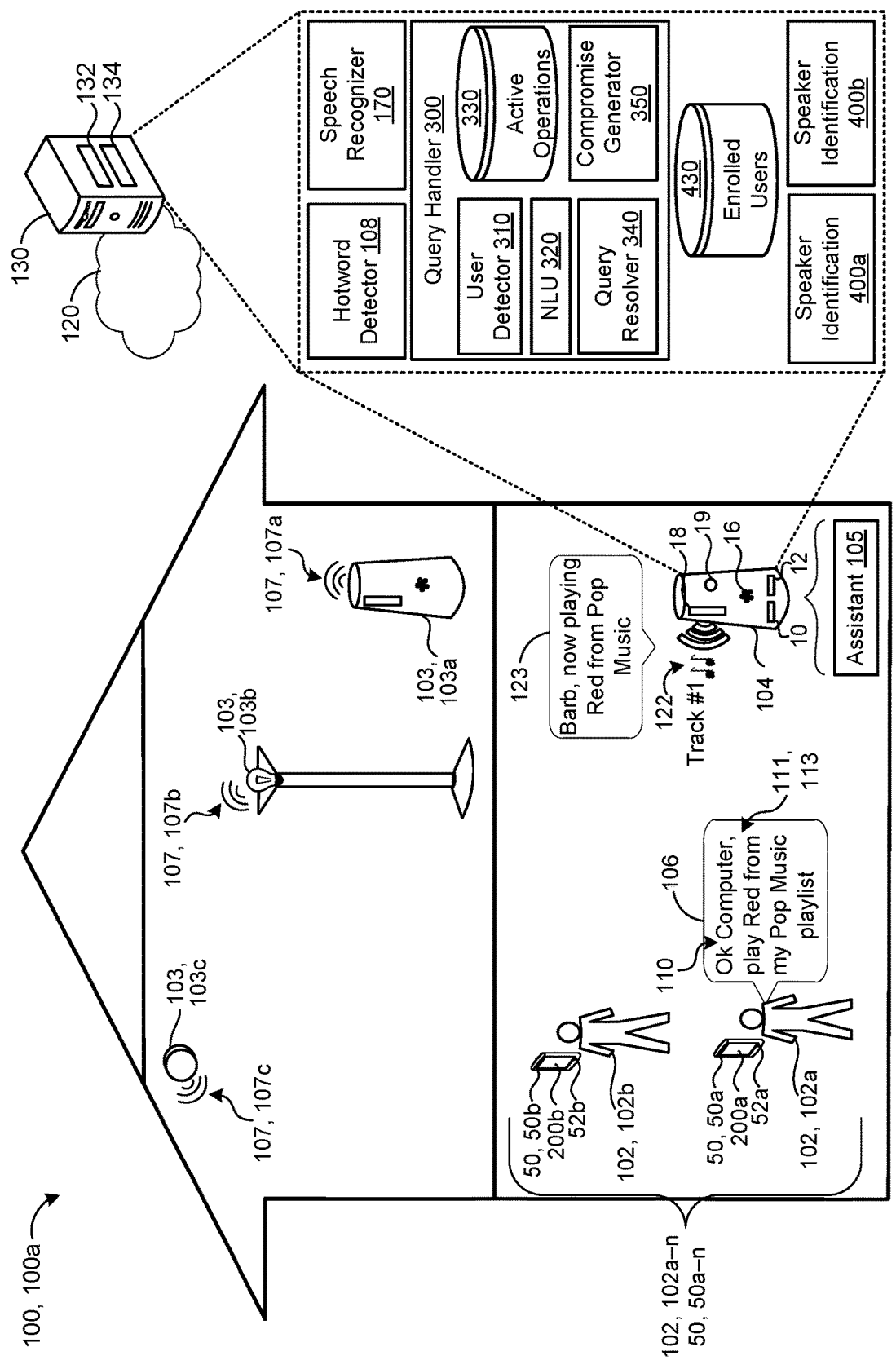
FIGS. 1A-1C are schematic views of an example system including multiple users controlling an assistant-enabled device.
Figure 1B:
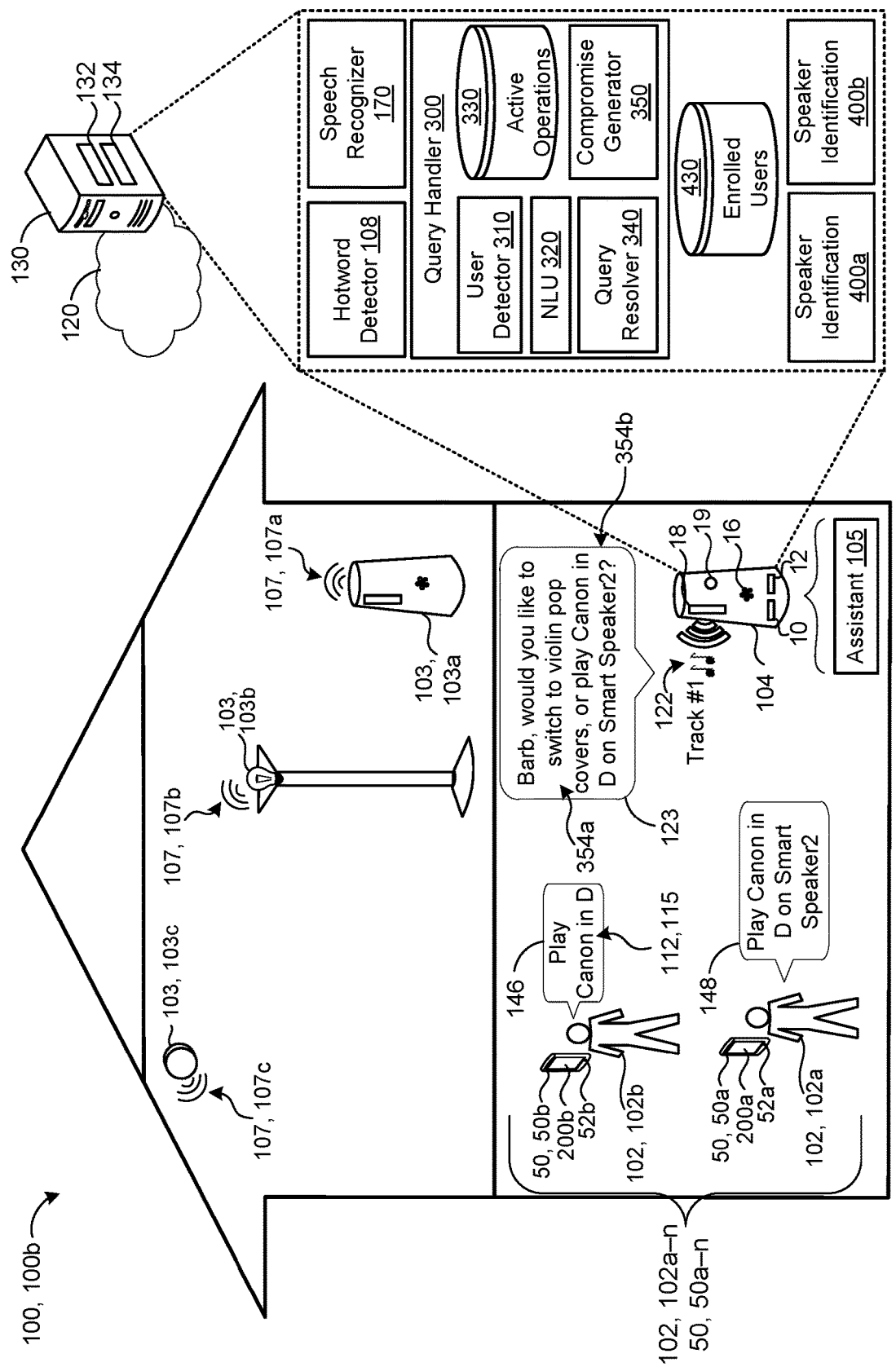
Figure 1C:
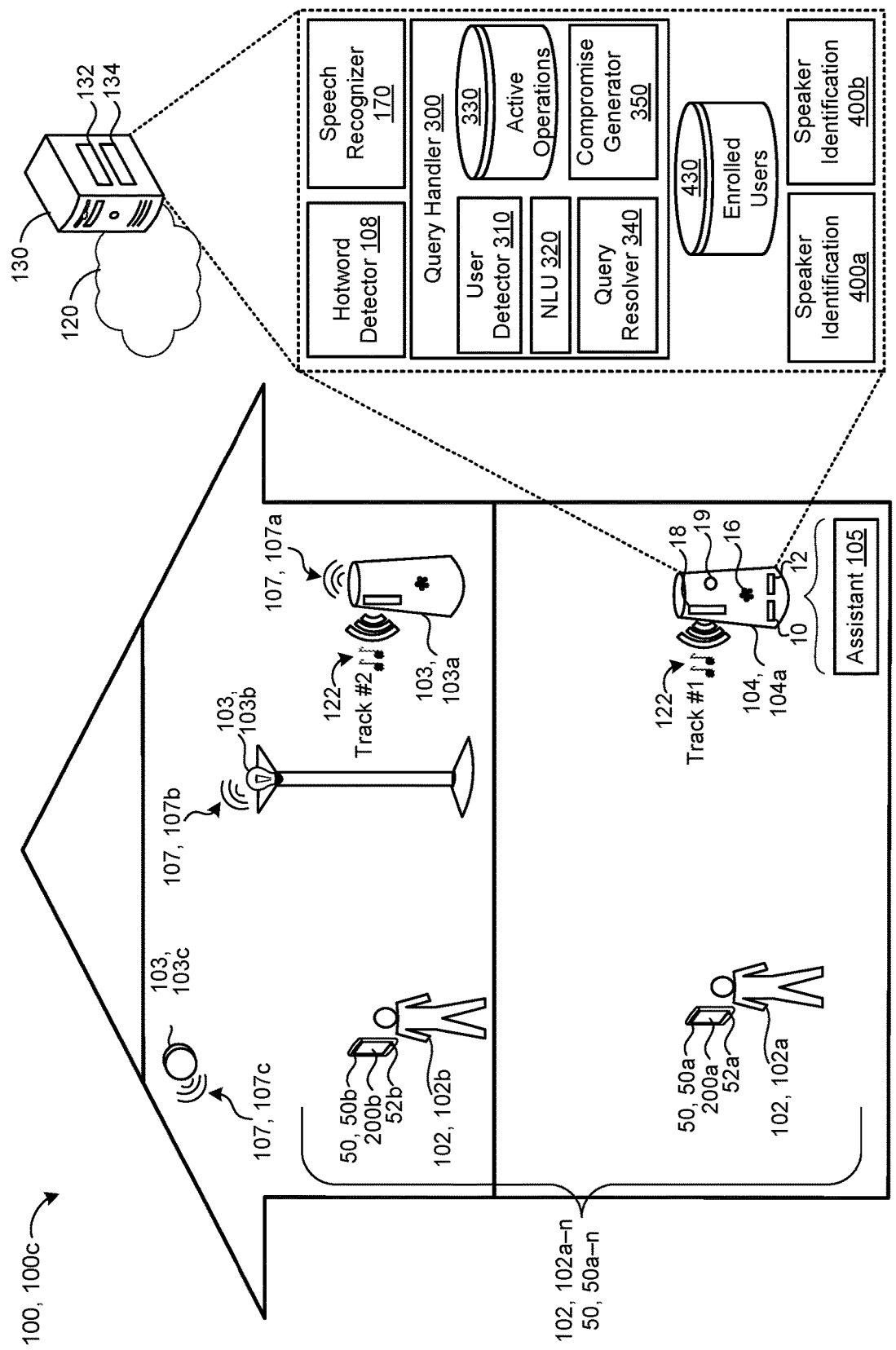

FIGS. 1A-1C illustrate example systems 100a-c for handling queries in an environment with multiple users 102, 102a-n using a query handler that balances queries from the multiple users 102 detected in the environment by offering compromises. Briefly, and as described in more detail below, a digital assistant 105 including a query handler 300 (FIG. 3) detects multiple users 102, 102a-b within the environment, and begins to play music 122 in response to receiving a first query 106, "Ok computer, play Red from my Pop Music playlist," issued by a user 102a. While the digital assistant 105 is performing the long-standing operation of playing the music 122 as playback audio from a speaker 18, the digital assistant 105 receives a second query 146 "Play Canon in D," spoken by another user 102b (FIG. 1B) that is different from the user 102a. Because the query handler 300 detects/recognizes that the other user 102b is different than the user 102a, and that the second query 146 issued by the user 102b conflicts with the first query 106 issued by the user 102a, the query handler 300 identifies one or more compromise operations 354, 354a-n (FIG. 3) for the digital assistant 105 to perform.

Figure 3:
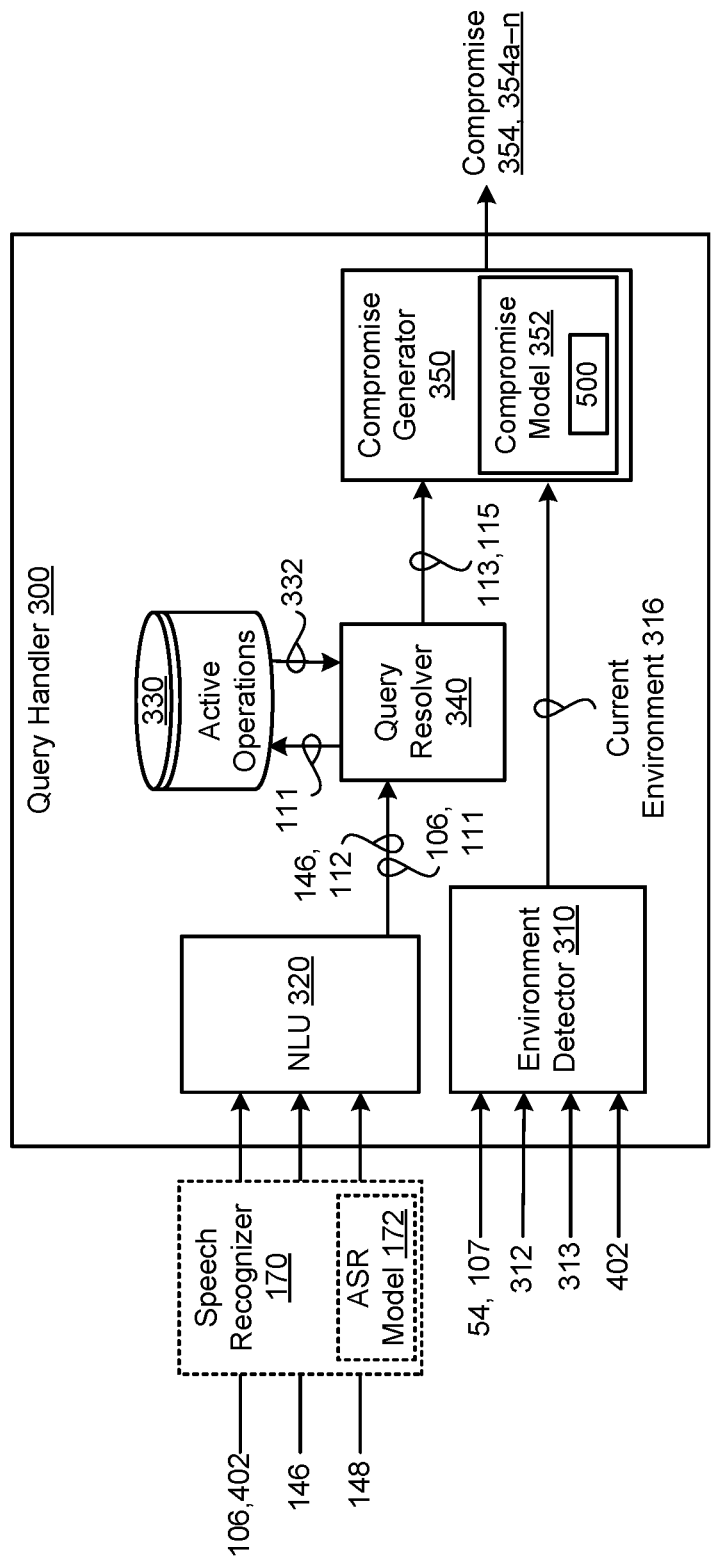
FIG. 3 is a schematic view of a query handling process.

The systems 100a-100c include an assistant-enable device (AED) 104 (i.e., also referred to as a 'primary AED 104') and plurality of secondary assistant-enabled devices (AEDs) 103, 103a-n located throughout the environment. In the examples shown, the environment may correspond to a home having a first floor and second floor, in which a first smart speaker 104 (i.e., AED 104) is located on the first floor, and a second smart speaker 103a, a smart light 103bc, and a smart thermostat 103c are located on the second floor. However, the AED 104 and/or the secondary AEDs 103 can include other computing devices, such as, without limitation, a smart phone, tablet, smart display, desktop/laptop, smart watch, smart glasses/headset, smart appliance, headphones, or vehicle infotainment device. As shown, the digital assistant 105 executes on the AED 104 that the multiple users 102 may interact with by issuing queries including commands to perform a long standing-action. The AED 104 includes data processing hardware 10 and memory hardware 12 storing instructions that when executed on the data processing hardware 10 cause the data processing hardware 10 to perform operations. The AED 104 includes an array of one or more microphones 16 configured to capture acoustic sounds such as speech directed toward the AED 104. The AED 104 may also include, or be in communication with, an audio output device (e.g., speaker) 18 that may output audio such as music 122 and/or synthesized speech from the digital assistant 105. Additionally, the AED 104 may include, or be in communication with, one or more cameras 19 configured to capture images within the environment and output image data 312 (FIG. 3).

In some implementations, each secondary AED 103 broadcasts proximity information 107, 107a-c receivable by an environment detector 310 (FIG. 3) that the digital assistant 105 executing on the AED 104 may use to determine the presence of each secondary AED 103. The digital assistant 105 may additionally use the proximity information 107 of each secondary AED 103 to infer a home graph to understand the spatial proximity of each secondary AED 103 relative to one another and relative to the AED 104 executing the digital assistant 105 (e.g., for determining which secondary AEDs 103 can be split/partitioned to perform conflicting long-standing operations). The proximity information 107 from each secondary AED 103 may include wireless communication signals, such as WiFi, Bluetooth, or Ultrasonic, in which the signal strength of the wireless communication signals received by the environment detector 310 may correlate proximities (e.g. distances) of the secondary AED 103 relative to the AED 104. Additionally or alternatively, the proximity information 107 from each secondary AED 103 may be determined by playing a fixed sound at the AED 104 to determine which of the secondary AEDs 103 in the environment detect the fixed sound to establish an approximate distance between the AED 104 and the secondary AEDs 103.

In some configurations, the digital assistant 105 is in communication with multiple user devices 50, 50a-n associated with the multiple users 102. In the examples shown, each user device 50 of the multiple user devices 50a-c includes a smart phone that the respective user 102 may interact with. However, the user device 50 can include other computing devices, such as, without limitation, a smart watch, smart display, smart glasses, a smart phone, smart glasses/headset, tablet, smart appliance, headphones, a computing device, a smart speaker, or another assistant-enabled device. Each user device 50 of the multiple user devices 50a-n may include at least one microphone 52, 52a-n residing on the user device 50 that is in communication with the digital assistant 105. In these configurations, the user device 50 may also be in communication with the one or more microphones 16 residing on the AED 104. Additionally, the multiple users 102 may control and/or configure the AED 104 and the secondary AEDs 103, as well as interact with the digital assistant 105, using an interface 200, such as a graphical user interface (GUI) 200 rendered for display on a respective screen of each user device 50.

As shown in FIGS. 1A-1C and 3, the digital assistant 105 implementing the query handler 300 manages queries issued by the multiple users 102 using the compromise generator 350. In some implementations, the query handler 300 includes a query resolver 340 that identifies conflicts between one or more queries received from each of the users 102 in the environment and a compromise generator 350 executing a compromise model 352 that identifies compromise operations 354 for the digital assistant 105 to perform. In this sense, the query handler 300 balances the competing interests of the multiple users 102 while minimizing the frequency at which queries of users 102 are overridden/interrupted by subsequent queries issued by other users 102 in the environment.

Figure 2A:
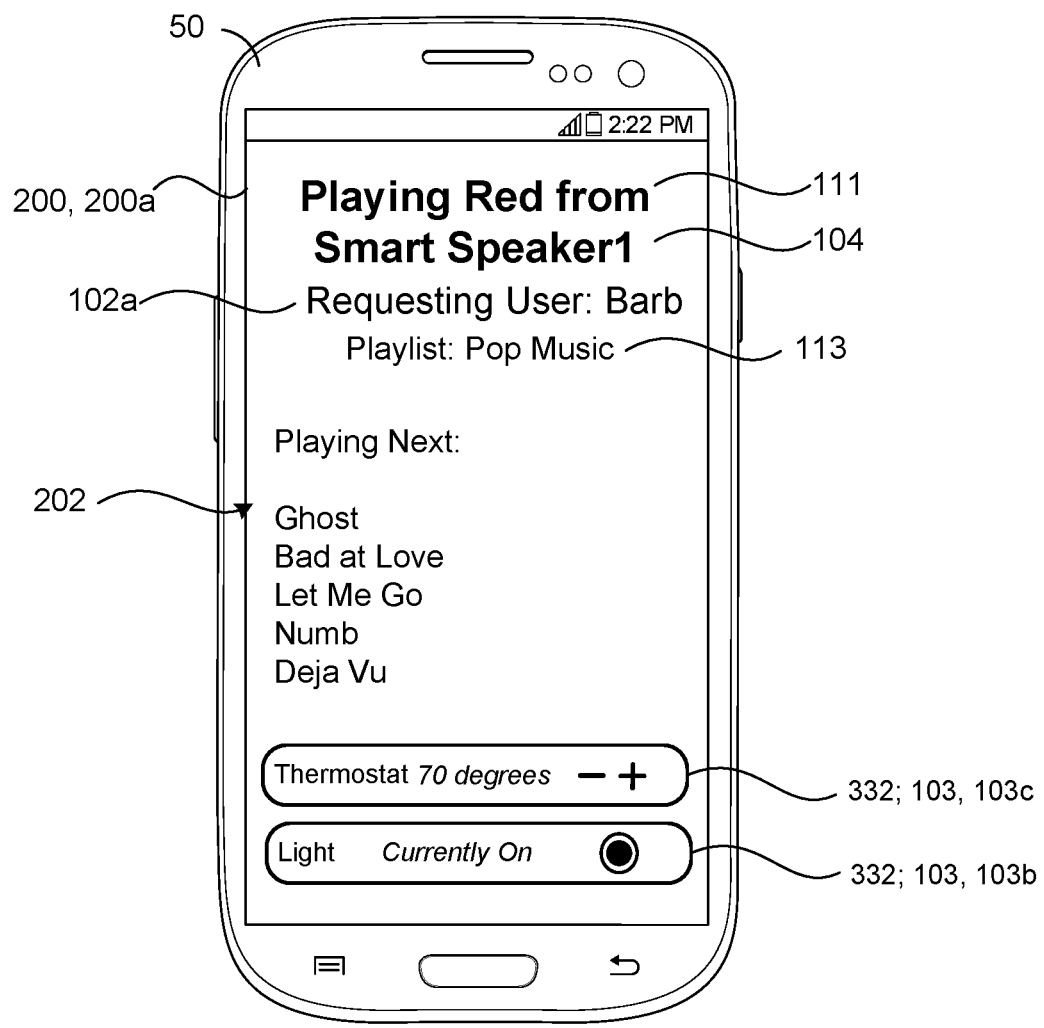
FIGS. 2A and 2B are example graphical user interfaces rendered on a screen of a user device to display a long-standing operation.
Figure 2B:
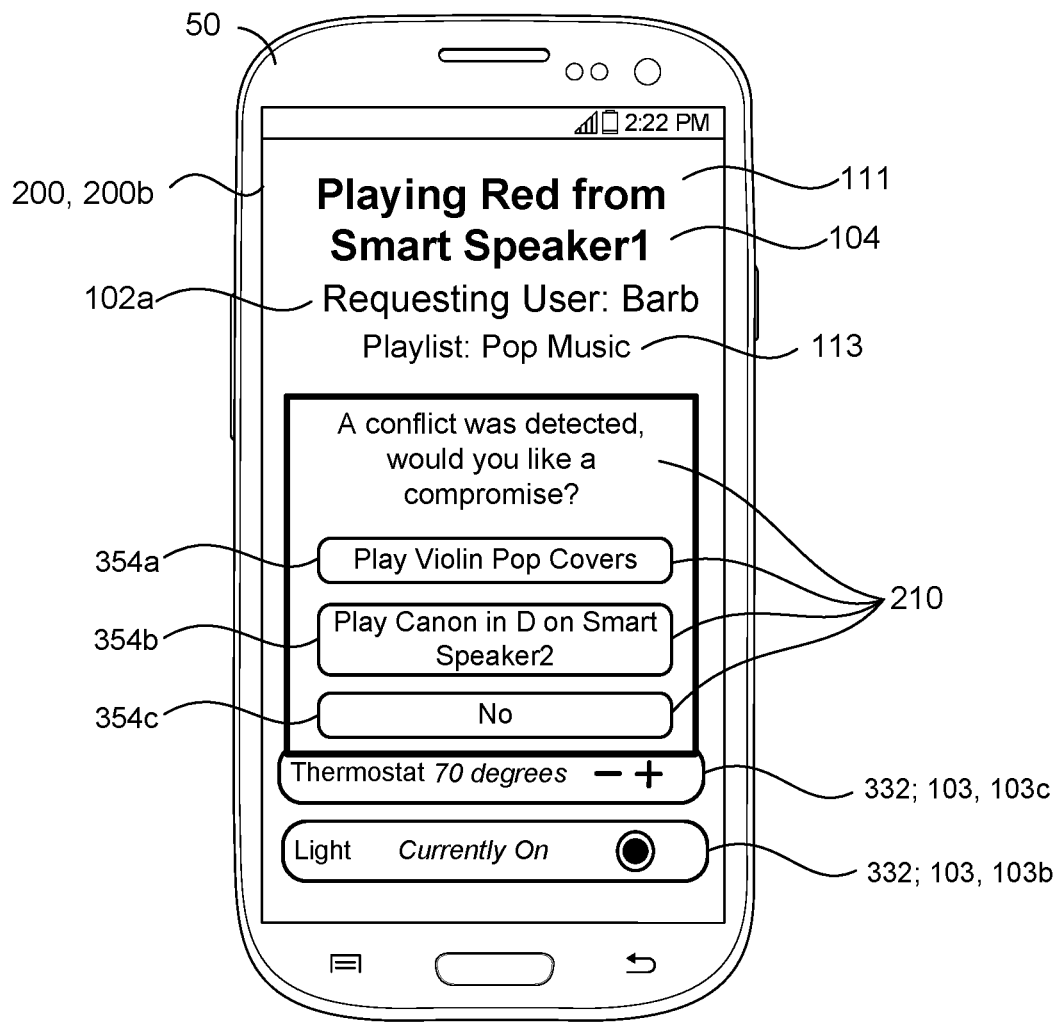

Referring to FIGS. 2A and 2B, the GUIs 200a, 200b of a user device 50 associated with a user 102 may display the current long-standing operation 111 (e.g., playing music 122) to keep each user 102 apprised of the active long-standing operations being performed by the digital assistant 105. In some configurations, the AED 104 includes a screen and renders the GUI 200 for displaying the active long-standing operations thereon. For instance, the AED 104 may include a smart display, tablet, or smart tv within the environment. FIG. 2A provides example GUI 200a displayed on a screen of a user device 50 associated with a user 102 that additionally may render for display an identifier of the current long-standing operation 111 (e.g., "Playing Red"), an identifier of the AED 104 (e.g., Smart Speaker1) that is currently performing the long-standing operation, an indication of the next songs 202 to be played during the long-standing operation (e.g., Playing Next), and/or an identity of the user 102a (e.g., Barb) that initiated the current long-standing operation being performed by the digital assistant 105. As mentioned above, the query handler 300 manages the long-standing operations such that the digital assistant 105 will prevent performance (or at least require attempt to implement a compromise) of a second action when the query handler 300 determines that another user 102 issued a second long-standing operation that conflicts with the first long-standing operation issued by the user 102a (e.g., Barb).

Referring again to FIGS. 1A-1C, the environment detector 310 may identify the user 102a (e.g., Barb) and the user 102b (e.g., Jeff) via proximity information 54 received from their respective user devices 50a, 50b. However, in other examples, the environment detector 310 may detect the users 102a, 102b detecting the respective user devices 50a, 50b (e.g., one or more of the users 102a, 102b chose not to share proximity information 54 from their respective user device 50a, 50b). However, the environment detector 310 still detects the presence of the users 102a, 102b (e.g., via speech data, image data, and/or inputs from the users 102a, 102b). Additionally, the environment detector may identify the secondary AEDs 103a-c via proximity information 107 received from the respective secondary AEDs 103. Thereafter, the environment detector 310 generates a home graph including the identities and locations of the users 102a, 102b and secondary AEDs 103 within the current environment 316. When a conflict arises, the query handler 300 may use the home graph representing the current environment 316 to generate the compromise operations 354.

Continuing with the example in FIG. 1A, the user 102a of the multiple users 102a-c is shown issuing a first query 106, "Ok computer, play Red from my Pop Music playlist" in the vicinity of the AED 104. Here, the first query 106 issued by the user 102a is spoken by the user 102a and includes initial audio data 402 (FIG. 3) corresponding to the first query 106. The first query 106 may further include a user input indication indicating a user intent to issue the first query, via any one of touch, speech, gesture, gaze, and/or an input device (e.g., mouse or stylus) for interacting with the AED 104. Optionally, based on receiving the initial audio data 402 corresponding to the first query 106, the query handler 300 resolves the identity of the speaker of the first query 106 by performing a speaker identification process 400a (FIG. 4A) on the audio data 402 and determining that the first query 106 was issued by the user 102a. In other implementations, the user 102a issues the first query 106 without speaking. In these implementations, the user 102a may issue the first query 106 via a user device 50a associated with the user 102a (e.g., entering text corresponding to the first query 106 into the GUI 200 displayed on the screen of the user device 50a associated with the user 102a, selecting the first query 106 displayed on the screen of the user device 50a, etc.). Here, the AED 104 may resolve the identity of the user 102 that issued the first query 106 by recognizing the user device 50a associated with the user 102a.

The microphone 16 of the AED 104 receives the first query 106 and processes the initial audio data 402 that corresponds to the first query 106. The initial processing of the audio data 402 may involve filtering the audio data 402 and converting the audio data 402 from an analog signal to a digital signal. As the AED 104 processes the audio data 402, the AED may store the audio data 402 in a buffer of the memory hardware 12 for additional processing. With the audio data 402 in the buffer, the AED 104 may use a hotword detector 108 to detect whether the audio data 402 includes the hotword. The hotword detector 108 is configured to identify hotwords that are included in the audio data 402 without performing speech recognition on the audio data 402.

In some implementations, the hotword detector 108 is configured to identify hotwords that are in the initial portion of the first query 106. In this example, the hotword detector 108 may determine that the first query 106 "Ok computer, play Red from my Pop Music playlist" includes the hotword 110 "ok computer" if the hotword detector 108 detects acoustic features in the audio data 402 that are characteristic of the hotword 110. The acoustic features may be mel-frequency cepstral coefficients (MFCCs) that are representations of short-term power spectrums of the first query 106 or may be mel-scale filterbank energies for the first query 106. For example, the hotword detector 108 may detect that the first query 106 "Ok computer, play Red from my Pop Music playlist" includes the hotword 110 "ok computer" based on generating MFCCs from the audio data 402 and classifying that the MFCCs include MFCCs that are similar to MFCCs that are characteristic of the hotword "ok computer" as stored in a hotword model of the hotword detector 108. As another example, the hotword detector 108 may detect that the first query 106 "Ok computer, play Glory, and let's stick to pop music tonight" includes the hotword 110 "ok computer" based on generating mel-scale filterbank energies from the audio data 402 and classifying that the mel-scale filterbank energies include mel-scale filterbank energies that are similar to mel-scale filterbank energies that are characteristic of the hotword "ok computer" as stored in the hotword model of the hotword detector 108.

When the hotword detector 108 determines that the initial audio data 402 that corresponds to the first query 106 includes the hotword 110, the AED 104 may trigger a wake-up process to initiate speech recognition on the audio data 402 that corresponds to the first query 106. For example, FIG. 3 shows the AED 104 including a speech recognizer 170 employing an automatic speech recognition model 172 that may perform speech recognition or semantic interpretation on the audio data 402 that corresponds to the first query 106. The speech recognizer 170 may perform speech recognition on the portion of the audio data 402 that follows the hotword 110. In this example, the speech recognizer 170 may identify the words "play Glory, and let's stick to pop music tonight" in the first query 106.

In some examples, the AED 104 is configured to communicate with a remote system 130 via a network 120. The remote system 130 may include remote resources, such as remote data processing hardware 132 (e.g., remote servers or CPUs) and/or remote memory hardware 134 (e.g., remote databases or other storage hardware). The query handler 300 may execute on the remote system 130 in addition to, or in lieu of the AED 104. The AED 104 may utilize the remote resources to perform various functionality related to speech processing and/or synthesized playback communication. In some implementations, the speech recognizer 170 is located on the remote system 130 in addition to, or in lieu of, the AED 104. Upon the hotword detector 108 triggering the AED 104 to wake-up responsive to detecting the hotword 110 in the first query 106, the AED 104 may transmit the initial audio data 402 corresponding to the first query 106 to the remote system 130 via the network 120. Here, the AED 104 may transmit the portion of the initial audio data 402 that includes the hotword 110 for the remote system 130 to confirm the presence of the hotword 110. Alternatively, the AED 104 may transmit only the portion of the initial audio data 402 that corresponds to the portion of the utterance 106 after the hotword 110 to the remote system 130, where the remote system 130 executes the speech recognizer 170 to perform speech recognition and returns a transcription of the initial audio data 402 to the AED 104.

With continued reference to FIGS. 1A-1C and 3, the query handler 300 may further include a natural language understanding (NLU) module 320 that performs semantic interpretation on the first query 106 to identify the query/command directed toward the AED 104. Specifically, the NLU module 320 identifies the words in the first query 106 identified by the speech recognizer 170, and performs semantic interpretation to identify any speech commands in the first query 106. The NLU module 320 of the AED 104 (and/or the remote system 130) may identify the words "play Red" as a command specifying a first long-standing operation 111 (i.e., play music 122) for the digital assistant 105, and the words "from my Pop Music playlist" as a criteria 113 for the digital assistant 105 to play music of a certain genre (e.g., pop music) while performing the first long-standing operation 111. In the example shown in FIG. 1A, the digital assistant 105 begins to perform the first long-standing operation 111 of playing music 122 as playback audio (e.g., Track #1) from the speaker 18 of the AED 104. The digital assistant 105 may stream the music 122 from a streaming service (not shown) or the digital assistant 105 may instruct the AED 104 to play music stored on the AED 104. While the example long-standing operation 111 includes music playback, the long-standing operation may include other types of media playback, such as video, podcasts, and/or audio books. The long-standing operation 111 may also include home automation (e.g, adjusting light levels, controlling a thermostat, etc.).

In the example shown in FIG. 1A while referring to FIG. 3, the query handler 300 adds the long-standing operation 111 to an active operations data store 330. The query handler 300 maintains a record of active operations 332 (e.g., light intensity in a smart lightbulb, temperature set points in a smart thermostat, etc.) in the environment in the active operations data store 330 (e.g., stored on the memory hardware 12, 134), and the query handler 300 may limit long-standing operations performed by the digital assistant 105 based on the active operations 332. For example, the query handler 300 may first verify, using a query resolver 340, that the first long-standing operation 111 in the first query 106 does not conflict with any active operations 332 in the environment before performing the first long-standing operation 111.

The AED 104 may notify the user 102a (e.g., Barb) that issued the first query 106 that the first long-standing operation 111 is being performed. For instance, the digital assistant 105 may generate synthesized speech 123 for audible output from the speaker 18 of the AED 104 that states, "Barb, now playing Red from Pop Music". In additional examples, the digital assistant 105 provides a notification to the user device 50a associated with the user 102a (e.g., Barb) to inform the user 102a of the approved first long-standing operation 111 and/or any active operations 332 stored in the active operations data store 330.

Referring to FIGS. 2A, a graphical user interface (GUI) 200a executing on a user device 50 may display the first long-standing operation 111 and/or any active operations 332 being performed on the secondary devices 103 within the environment. As used herein, the GUI 200a may receive user input indications via any one or of touch, speech, gesture, gaze, and/or an input device (e.g., mouse or stylus) for interacting with the digital assistant 105. For example, the GUI 200a in FIG. 2A may render for display an identifier of the current long-standing operation 111 (e.g., "Playing Red"), an identifier of the AED 104 (e.g., smart speaker1) that is currently performing the long-standing operation 111, an identifier of the criteria 113 (e.g., Pop Music) associated with the first query 106, an indication of the next songs 202 to be played during the long-standing operation (e.g., Playing Next), and/or an identity of the user 102a (e.g., Barb) that issued the first query 106. In implementations where the first query 106 includes the criteria 113 (e.g., pop music), the GUI 200a renders, for display, an identifier of the criteria 113. Additionally, the GUI 200a renders an identifier for the smart thermostat 103c and an indication of the active long-standing operation 332 that the setpoint is at 70 degrees, and an identifier for the smart lightbulb 103b and an indication of the active long-standing operation 332 that the light is on. Accordingly, a user 102 may consult the user device 50 to review the active long-standing operations within the environment of the digital assistant 105 and any criteria 113 that may limit queries issued by the users 102.

Figure 4A:
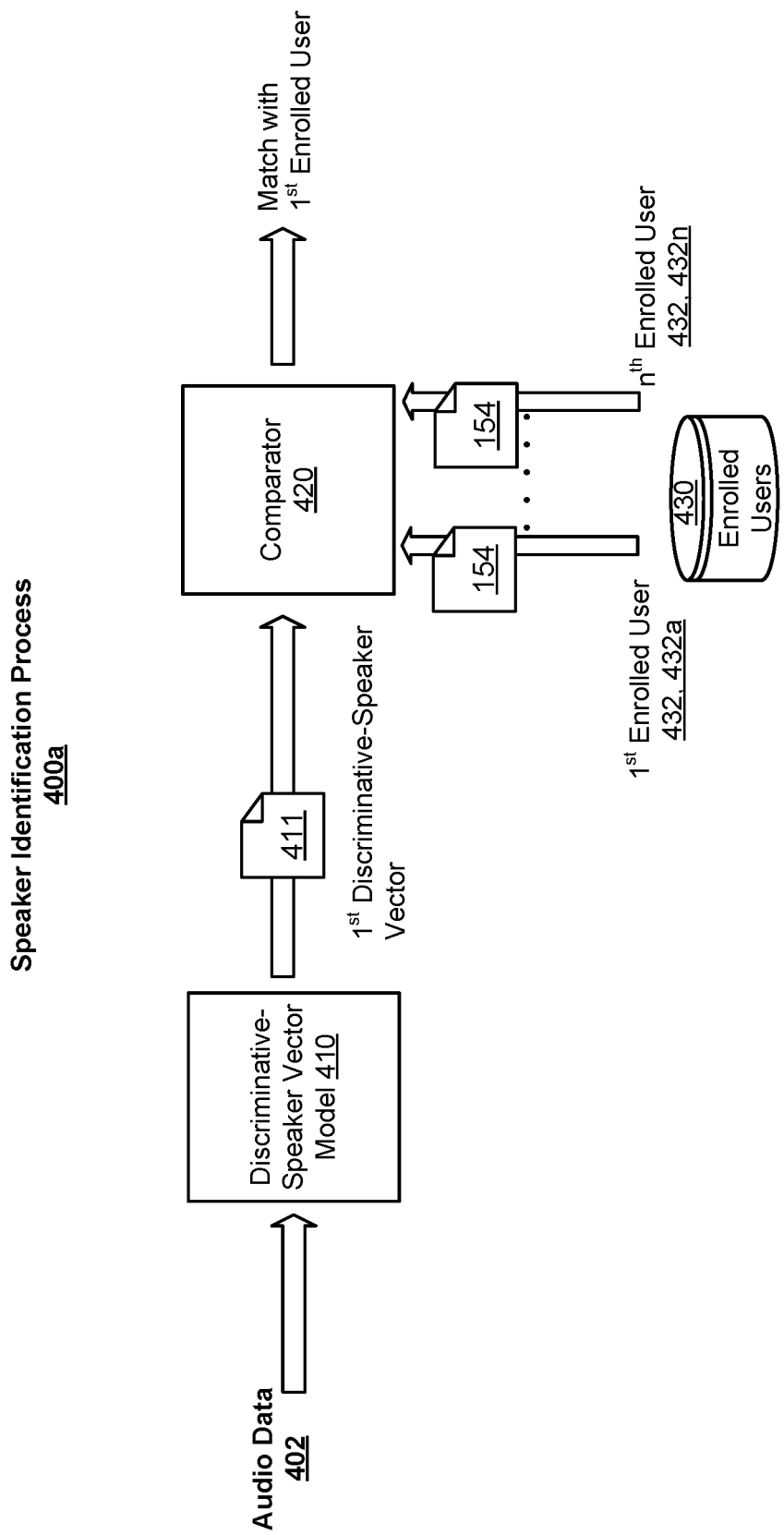
FIG. 4A is a schematic view of a speaker identification process.
Figure 4B:
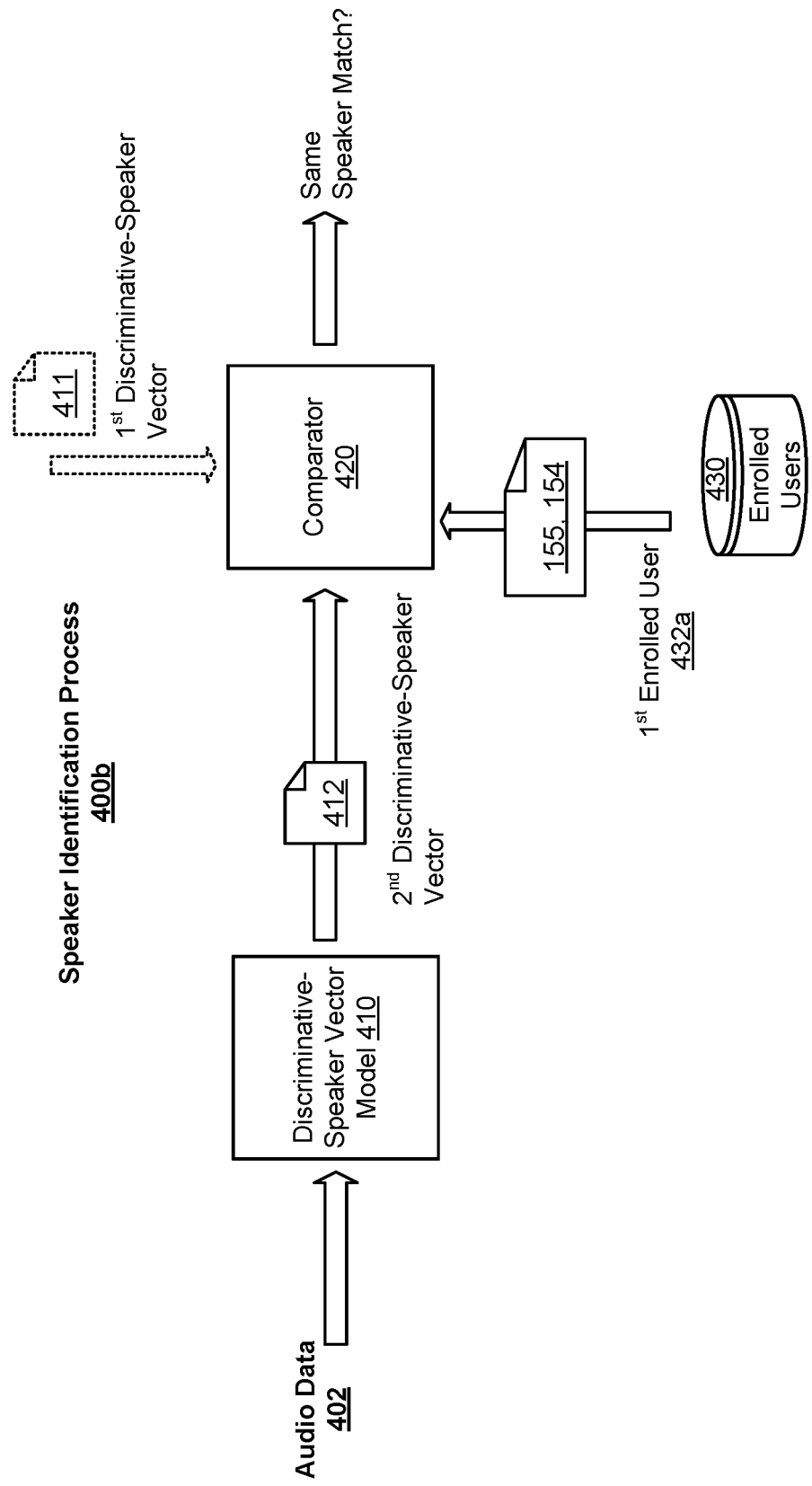
FIG. 4B is schematic views of a speaker verification process.

Referring to FIGS. 4A and 4B, in some implementations, the AED 104 (or the remote system 130 in communication with the AED 104) also includes an example data store 430 storing enrolled user data/information for each of multiple enrolled users 432a-n of the AED 104. Here, each enrolled user 432 of the AED 104 may undertake a voice enrollment process to obtain a respective enrolled speaker vector 154 from audio samples of multiple enrollment phrases spoken by the enrolled user 432. For example, a speaker-discriminative model 410 may generate one or more enrolled speaker vectors 154 from the audio samples of enrollment phrases spoken by each enrolled user 432 that may be combined, e.g., averaged or otherwise accumulated, to form the respective enrolled speaker vector 154. One or more of the enrolled users 432 may use the AED 104 to conduct the voice enrollment process, where the microphone 16 captures the audio samples of these users speaking the enrollment utterances and the speaker-discriminative model 410 generates the respective enrolled speaker vectors 154 therefrom. The model 410 may execute on the AED 104, the remote system 130, or a combination thereof. Additionally, one or more of the enrolled users 432 may enroll with the AED 104 by providing authorization and authentication credentials to an existing user account with the AED 104. Here, the existing user account may store enrolled speaker vectors 154 obtained from a previous voice enrollment process with another device also linked to the user account.

In some examples, the enrolled speaker vector 154 for an enrolled user 432 includes a text-dependent enrolled speaker vector. For instance, the text-dependent enrolled speaker vector may be extracted from one or more audio samples of the respective enrolled user 432 speaking a predetermined term such as the hotword 110 (e.g., "Ok computer") used for invoking the AED 104 to wake-up from a sleep state. In other examples, the enrolled speaker vector 154 for an enrolled user 432 is text-independent obtained from one or more audio samples of the respective enrolled user 102 speaking phrases with different terms/words and of different lengths. In these examples, the text-independent enrolled speaker vector may be obtained over time from audio samples obtained from speech interactions the user 102 has with the AED 104 or other device linked to the same account.

Referring to FIG. 4A, the speaker identification process 400a identifies the user 102a (e.g., Barb) that spoke the first query 106 by first extracting, from the initial audio data 402 corresponding to the first query 106, a first speaker-discriminative vector 411 representing characteristics of the first query 106 issued by the user 102a. Here, the speaker identification process 400a may execute a speaker-discriminative model 410 configured to receive the audio data 402 corresponding to the second query 146 as input and generate, as output, the first speaker-discriminative vector 411. The speaker-discriminative model 410 may be a neural network model trained under machine or human supervision to output speaker-discriminative vectors 411. The speaker-discriminative vector 411 output by the speaker-discriminative model 410 may include an N-dimensional vector having a value that corresponds to speech features of the first query 106 that are associated with the user 102a. In some examples, the speaker-discriminative vector 411 is a d-vector. In some examples, the first speaker-discriminative vector 411 includes a set of speaker-discriminative vectors each associated with a different user who is also authorized to control the AED 104. For instance, aside from the user 102a that spoke the first query 106, other authorized users could include other individuals who were present when the user 102a spoke the first query 106 issuing the command 111 to perform the first action and/or individuals that the user 102a added/specified as being authorized.

Once the first speaker-discriminative vector 411 is output from the model 410, the speaker identification process 400a determines whether the extracted speaker-discriminative vector 411 matches any of the enrolled speaker vectors 154 stored on the AED 104 (e.g., in the memory hardware 12) for the enrolled users 432a-n of the AED 104. As described above, the speaker-discriminative model 410 may generate the enrolled speaker vectors 154 for the enrolled users 432 during a voice enrollment process. Each enrolled speaker vector 154 may be used as a reference vector 155 corresponding to a voiceprint or unique identifier representing characteristics of the voice of the respective enrolled user 432.

In some implementations, the speaker identification process 400a uses a comparator 420 that compares the first speaker-discriminative vector 411 to the respective enrolled speaker vector 154 associated with each enrolled user 432a-n of the AED 104. Here, the comparator 420 may generate a score for each comparison indicating a likelihood that the initial audio data 402 corresponding to the first query 106 corresponds to an identity of the respective enrolled user 432, and the identity is accepted when the score satisfies a threshold. When the score does not satisfy the threshold, the comparator 420 may reject the identity of the speaker that issued the first query 106. In some implementations, the comparator 420 computes a respective cosine distance between the first speaker-discriminative vector 411 and each enrolled speaker vector 154 and determines the first speaker-discriminative vector 411 matches one of the enrolled speaker vectors 154 when the respective cosine distance satisfies a cosine distance threshold.

In some examples, the first speaker-discriminative vector 411 is a text-dependent speaker-discriminative vector extracted from a portion of one or more words that correspond to the first query 106 and each enrolled speaker vector 154 is also text-dependent on the same one or more words. The use of text-dependent speaker vectors can improve accuracy in determining whether the first speaker-discriminative vector 411 matches any of the enrolled speaker vectors 154. In other examples, the first speaker-discriminative vector 411 is a text-independent speaker-discriminative vector extracted from the entire initial audio data 402 that corresponds to the first query 106.

When the speaker identification process 400a determines that the first speaker-discriminative vector 411 matches one of the enrolled speaker vectors 154, the process 400a identifies the user 102a that spoke the first query 106 as the respective enrolled user 432a associated with the one of the enrolled speaker vectors 154 that matches the extracted speaker-discriminative vector 411. In the example shown, the comparator 420 determines the match based on the respective cosine distance between the first speaker-discriminative vector 411 and the enrolled speaker vector 154 associated with the enrolled user 432a satisfying a cosine distance threshold. In some scenarios, the comparator 420 identifies the user 102a as the respective enrolled user 432a associated with the enrolled speaker vector 154 having the shortest respective cosine distance from the first speaker-discriminative vector 411, provided this shortest respective cosine distance also satisfies the cosine distance threshold.

Conversely, when the speaker identification process 400a determines that the first speaker-discriminative vector 411 does not match any of the enrolled speaker vectors 154, the process 400a may identify the user 102a that spoke the utterance 106 as a guest user of the AED 104. Accordingly, the query handler 300 may add the guest user, and use the first speaker-discriminative vector 411 as a reference speaker vector 155 representing the speech characteristics of the voice of the guest user. In some instances, the guest user could enroll with the AED 104 and the AED 104 could store the first speaker-discriminative vector 411 as a respective enrolled speaker vector 154 for the newly enrolled user.

Referring back to FIG. 1B, while the digital assistant 105 performs the first long-standing operation 111 of playing the music 122 as playback audio from the speaker 18 of the AED 104, the digital assistant 105 receives a second query 146 specifying a second long-standing operation 112 for the digital assistant 105 to perform. In the example shown, another user 102b that is different from the user 102a that issued the first query 106 issues the second query 146 "Play Canon in D" including the command for the digital assistant 105 to perform the second long-standing operation 112 of playing a song (i.e., Canon in D) with an associated criteria 115 for the digital assistant 105 to play music of a certain genre (e.g., classic music). Based on receiving the second query 146, the query handler 300 resolves the identity of the speaker of the second query 146 by performing a speaker identification process 400b (FIG. 4B) on the audio data 402 corresponding to the second query 146 and determines that the second query 146 was issued by another user 102b different than the user 102a that issued the first query 106. As described above with reference to FIG. 4A, in implementations where the first query 106 issued by the user 102a includes initial audio data 402 (e.g., the first query 106 was spoken by the first user 102a), the query handler 300 may first perform the speaker identification process 400a on the initial audio data 402 corresponding to the first query 106 to identity the user 102a that issued the first query 106.

The speaker identification process 400b may execute on the data processing hardware 12 of the AED 104. The speaker identification process 400b may also execute on the remote system 130. If the speaker verification process 400b on the audio data 402 corresponding to the second query 146 indicates that the second query 146 was spoken by the same user 102a that issued the first query 106, the digital assistant 105 may proceed with performing the second long-standing operation 105 without first determining whether the first long-standing operation 111 and the second long-standing operation 112 conflict. In other words, when the same user 102a issued both queries 106, 146, the query handler 300 may not be needed to resolve a conflict between users 102. Conversely, if the speaker verification process 400b on the audio data 402 corresponding to the second query 146 indicates that the second query 146 was spoken by the other user 102b that is different than the user 102a that issued the first query 106, the query handler 300 may prevent performance (or at least require input from the one or more other users 102 in the environment (e.g., in FIGS. 1B and 2B)) of the second long-standing operation 112.

Referring again to FIG. 4B with reference to the example of FIG. 1B, in response to receiving the second query 146, the AED 104 resolves the identity of the user 102 that spoke the second query 146 by performing the speaker identification process 400b. The speaker identification process 400b identifies the user 102a that spoke the first query 146 by first extracting, from the audio data 402 corresponding to the first query 146 spoken by the user 102a, a second speaker-discriminative vector 412 representing characteristics of the second query 146. Here, the speaker verification process 400b may execute the speaker-discriminative model 410 configured to receive the audio data 402 as input and generate, as output, the second speaker-discriminative vector 412. As discussed above in FIG. 4A, the speaker-discriminative model 410 may be a neural network model trained under machine or human supervision to output speaker-discriminative vectors 412. The second speaker-discriminative vector 412 output by the speaker-discriminative model 410 may include an N-dimensional vector having a value that corresponds to speech features of the utterance 146 that are associated with the user 102a. In some examples, the speaker-discriminative vector 412 is a d-vector.

Once the second speaker-discriminative vector 412 is output from the speaker-discriminator model 410, the speaker verification process 400b determines whether the extracted speaker-discriminative vector 412 matches a reference speaker vector 155 associated with the first enrolled user 432a stored on the AED 104 (e.g., in the memory hardware 12). The reference speaker vector 155 associated with the first enrolled user 432a may include the respective enrolled speaker vector 154 associated with the first enrolled user 432a. As discussed above, the speaker-discriminative model 410 may generate the enrolled speaker vectors 154 for the enrolled users 432 during a voice enrollment process. Each enrolled speaker vector 154 may be used as a reference vector corresponding to a voiceprint or unique identifier representing characteristics of the voice of the respective enrolled user 432.

In some implementations, the speaker verification process 400b uses a comparator 420 that compares the second speaker-discriminative vector 412 to the reference speaker vector 155 associated with the first enrolled user 432a of the enrolled users 432. Here, the comparator 420 may generate a score for the comparison indicating a likelihood that the second query 146 corresponds to the identity of the first enrolled user 432a, and the identity is accepted when the score satisfies a threshold. When the score does not satisfy the threshold, the comparator 420 may reject the identity. In some implementations, the comparator 420 computes a respective cosine distance between the second speaker-discriminative vector 412 and the reference speaker vector 155 associated with the first enrolled user 432a and determines the second speaker-discriminative vector matches the reference speaker vector 155 when the respective cosine distance satisfies a cosine distance threshold.

When the speaker verification process 400b determines that the second speaker-discriminative vector 412 matches the reference speaker vector 155 associated with the first enrolled user 432a, the process 400b identifies the user 102a that spoke the second query 146 as the first enrolled user 432a associated with the reference speaker vector 155. In the example shown, the comparator 420 determines the match based on the respective cosine distance between the second speaker-discriminative vector 412 and the reference speaker vector 155 associated with the first enrolled user 432a satisfying a cosine distance threshold. In some scenarios, the comparator 420 identifies the user 102a as the respective first enrolled user 432a associated with the reference speaker vector 155 having the shortest respective cosine distance from the second speaker-discriminative vector 412, provided this shortest respective cosine distance also satisfies the cosine distance threshold.

With reference to FIG. 4A above, in some implementations, the speaker identification process 400a determines that the first speaker-discriminative vector 411 does not match any of the enrolled speaker vectors 154, and identifies the user 102a that spoke the first query 106 as a guest user of the AED 104. Accordingly, the speaker verification process 400b may first determine whether the user 102a that spoke the first query 106 was identified by the speaker identification process 400a as an enrolled user 432 or a guest user. When the user 102a is a guest user, the comparator 420 compares the second speaker-discriminative vector 412 to the first speaker-discriminative vector 411 obtained during the speaker identification process 400a. Here, the first speaker-discriminative vector 411 represents the characteristics of the first query 106 spoken by the guest user 102a, and thus, is used as a reference vector to verify whether or not the second query 146 was also spoken by the guest user 102a or another user 102. Here, the comparator 420 may generate a score for the comparison indicating a likelihood that the second query 146 corresponds to the identity of the guest user 102a, and the identity is accepted when the score satisfies a threshold. When the score does not satisfy the threshold, the comparator 420 may reject the identity of the guest user that spoke the second query 146. In some implementations, the comparator 420 computes a respective cosine distance between the first speaker-discriminative vector 411 and the second speaker-discriminative vector 412 and determines the first speaker-discriminative vector 411 matches the second speaker-discriminative vector 412 when the respective cosine distance satisfies a cosine distance threshold.

Referring back to FIG. 1B, based on determining that the second query 146 was spoken by the other user 102b that is different than the user 102a that issued the first query 106, the NLU module 320 executing on the AED 104 (and/or executing on the remote system 130) may identify the words "play Canon in D" as a command specifying a second long-standing operation 112 (i.e., play music 122). Here the query handler 300 may first determine, using a query resolver 340, whether the performing the second long-standing operation 112 conflicts with the first long-standing operation 111 before allowing the digital assistant 105 to perform the second long-standing operation 112. For example, the query handler 300 may determine whether the first long-standing operation 111 and the second long-standing operation 112 invoke the same functions of the digital assistant 105 (e.g., playing music) or different functions (e.g, playing music and changing a brightness setting on a smart lightbulb). In examples where the first long-standing operation 111 and the second long-standing operation 112 invoke the same functions, the query resolver 340 determines that the long-standing operations conflict, and outputs the conflicting long-standing operations 111, 112 for the query handler 300 to determine one or more compromise operations for the users 102a, 102b.

In some examples, the query resolver 340 only outputs the first long-standing operation 111 and the second long-standing operation 112 (thereby triggering the query handler 300 to identify one or more compromise operations 354) when it determines that the second long-standing operation 112 conflicts with the first long-standing operation 111. Conversely, where the first long-standing operation 111 and the second long-standing operation 112 invoke different functions, the query resolver 340 determines that the second long-standing operation 112 does not conflict with the first long-standing operation 111. Here, the query resolver 340 only outputs the long-standing operations 111, 112, thereby prompting the query handler 300 to identify one or more compromise operations 354 when a conflict exists representing competing interests between the user 102a and the user 102b. Additionally, as discussed above, the query resolver 340 may verify that the second long-standing operation 112 in the first query 106 does not conflict with the active operations 332 stored in the active operations data store 300 before performing the second long-standing operation 112.

In the example, the query resolver 340 determines that the second long-standing operation 112 of playing Canon in D conflicts with the first long-standing operation 111 of playing Red, as performing the second long-standing operation 112 via a speaker 18 of the AED 104 necessarily interrupts the performance of the first long-standing operation 111 currently playing on the speaker 18 of the AED 104. Based on determining that the second user 102b issued the second query 146, and determining that the second query 146 conflicts with the first query 106 issued by the user 102a, the query handler 300 prevents the AED 104 (via the digital assistant 105) from performing the second long-standing operation 112, and instead generates one or more compromise operations 354, 354a-n that the users 102a, 102b may agree on. In other words, after the user 102a is determined as the issuer of the first query 106 and the user 102b is determined as the issuer of the second query 146, the query handler 300 attempts to respect the first long-standing operation 111 and the second long-standing operation 112 by determining a compromise solution.

Referring back to FIG. 3, in some implementations, the query handler 300 includes a compromise generator 350 that uses one or more approaches to generate the one or more compromise operations 354, 354a-n. For example, the compromise generator 350 may execute a compromise model 352 configured to receive the first query 106 and the second query 146 as input and generate, as output, one or more compromise operations 354 that combine the first query 106 and the second query 146. For example, if a first query requests "party music" and a second query requests "classical music," the compromise generator 350 may output a compromise operation to play "upbeat classical music." Similarly, if a first query requests to turn a light up, and a second query requests to turn a light down, the compromise generator 350 may output a compromise of a medium level of lighting to accommodate the criteria in both queries.

The compromise model 352 may be a neural network model trained under machine or human supervision to output compromise operations 354. In other implementations, the compromise generator 350 includes a plurality of compromise models (e.g., some compromise models that comprise a neural network, some compromise models that do not comprise a neural network). In these implementations, the compromise generator 350 may select which compromise model of the plurality of compromise models to use as the compromise model 352 based on the category of actions the queries are associated with.

Continuing with the example, the compromise generator 350 identifies the criteria (e.g., Red) 113 associated with the first query 106 and the criteria (e.g., Canon in D) 115 associated with the second query 146. The compromise model 352 receives the criteria 113 associated with the first query 106 and the criteria 115 associated with the second query 146 as input and generates, as output, a first query embedding 502 (FIG. 5) based on the criteria 113 associated with the first query 106, and a second query embedding 504 (FIG. 5) based on the criteria 115 associated with the second query 146. In the example of FIG. 3 while referring to FIG. 5, the compromise model 352 may determine a combined embedding 506 based on the first query embedding 502 and the second query embedding 504 and identify at least one compromise operation 354 that maps (e.g., is pre-mapped or pre-defined) to the combined embedding 506 in an embedding space 500. For example, the compromise model 352 averages the first query embedding 502 and the second query embedding 504 to generate the combined embedding 506. In other examples, where the space between the first query embedding 502 and the second query embedding 504 is too great, the compromise model 352 generates the compromise operation 354 without pre-mapping the compromise operation 354 to the combined embedding 506. In some implementations, the combined embedding 506 includes a conflict score that predicts the degree of conflict between the first query embedding 502 and the second query embedding 504.

In other examples, the identified criteria associated with a first query includes a first value for a setting of a home automation device (e.g., a smart thermostat, a smart light, a smart speaker, or a smart display) while a second query includes a second value for the setting of the home automation device. Here, the identified at least one compromise operation 354 includes adjusting the first value for the setting of the home automation device to a new value. For example, the compromise model 352 may include a heuristic model that parses the first value and the second value and determines an average between the first value and the second value to set as the new value. In some examples, the home automation device corresponds to the secondary AEDs 103 in the environment.

Figure 5:
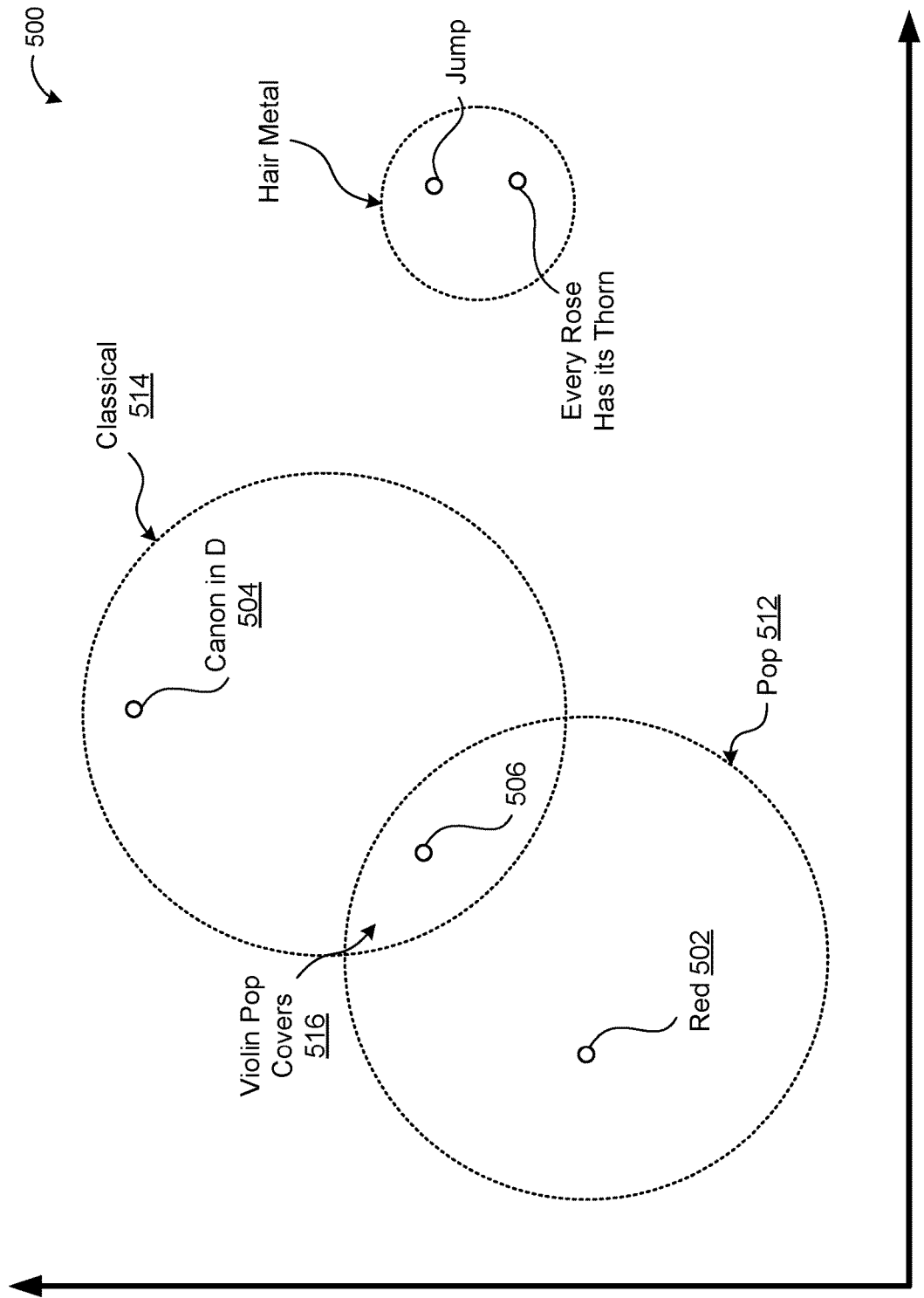
FIG. 5 is an embedding space for a query handling process.

Continuing with the music playback example, as shown in FIG. 5, the average embedding 506 is determined based on preferences of the queries. Here, the identified criteria 113 associated with the first query embedding 502 includes a first preference 512 in the embedding space 500 for a type of media content (i.e., pop music) for playback from the AED 104 executing the digital assistant 105. Additionally, the identified criteria 115 associated with the second query embedding 504 includes a second preference 514 in the embedding space 500 for a type of media content (i.e., classical music) for playback from the AED 104 executing the digital assistant 105. Here, while the queries 106, 146 do not expressly state the preferences 512, 514, the compromise generator 350 infers them based on the genre of music the songs "Red" and "Canon in D" are associated with. In this example, the type of media content includes music, where the first preference 512 includes a first genre of music (i.e., pop) and the second preference 514 includes a second genre of music (i.e., classical). As shown, the first preference 512 and the second preference 514 overlap in an area that includes a third preference 516 in the embedding space 500 for a third genre of music (i.e., violin pop covers) for a type of medial content. Based on the combined embedding 506, the compromise model 352 generates, as output, the compromise operation 354 to continue to playback media, but change the long-standing operation to the third preference 516 of playing violin pop covers. In examples where the preference of the first query and the preference of the second query do not overlap (e.g., classical music and hair metal), the compromise model 350 may infer that a type of music that combines classical music and hair metal does not exist and therefore may not output a compromise operation 354 that combines the preferences.

Referring back to FIG. 3, in some implementations, the compromise model 352 of the compromise generator 350 determines whether a conflicting long-standing operation can be offloaded (i.e., split/divide AEDs) to a second AED 103 in the environment rather than interrupt the current long-standing operation. As described above with reference to FIGS. 1A-1C during execution of the digital assistant 105, the AED 104 detects the multiple users 102a, 102b and the secondary devices 103a-c in the environment using the environment detector 310 of the query handler 300. For example, the query handler 300 receives proximity information 54 for the location of each of the multiple users 102a, 102b and proximity information 107 for the location of each of the secondary AEDs 103 relative to the AED 104. By monitoring the presence and relative locations of each of the users 102 and secondary AEDs 103 within the environment, the environment detector 310 can provide the compromise generator 350 with the home graph representing a current environment 316 when the query resolver 340 identifies a conflict between the first long-standing operation 111 and the second long-standing operation 112. In the home graph representing the current environment 316, the environment detector 310 may identify which secondary AEDs 103 are available, far enough away from the AED 104 to not interfere with an active long-standing operation, and/or close enough to the user 102 requesting the conflicting long-standing operation that the requesting user 102 may prefer the secondary AED 103 to perform the conflicting long-standing operation.

In some implementations, each user device 50a-c of the multiple users 102 broadcasts proximity information 54 and each secondary AED 103a-c broadcasts proximity information 107 receivable by the environment detector 310 that the AED 104 may use to determine the proximity of each user device 50 and secondary user device 103 relative to the AED 104. The proximity information 54 from each user device 50 and the proximity information 107 from each secondary AED 103 and the AED 104 may include wireless communication signals, such as WiFi, Bluetooth, or Ultrasonic, in which the signal strength of the wireless communication signals received by the environment detector 310 may correlate proximities (e.g. distances) of the user device 50 and/or the secondary AED 103 relative to the AED 104.

In implementations where a user 102 does not have a user device 50, or has a user device 50 that does not share proximity information 54, the environment detector 310 may detect the users 102 based on an explicit input (e.g., a guest list) 313 received from the user 102a that issued the first query 106. For example, the environment detector 310 receives a guest list 313 from a seed user 102 (e.g., user 102a) indicating the identities of each user 102 of the multiple users 102. Alternatively, the environment detector 310 detects one or more of the users 102 by performing speaker identification (FIGS. 4A and 4B) on utterances corresponding to audio data 402 detected within the environment. In other implementations, the environment detector 310 automatically detects the multiple users 102 and/or secondary AEDs 103 in the environment by receiving image data 312 corresponding to a scene of the environment and obtained by the camera 19. Here, the environment detector 310 detects the multiple users 102 and/or secondary AEDs 103 based on the received image data 312.

In some implementations, the environment detector 310 maintains the home graph representing the current environment 316 of the users 102 and the secondary AEDs 103 as the users 102 move throughout the environment. Here, the home graph indicates the users 102 and secondary AEDs 103 in relation to one another, to the rooms/floors within the environment, and to the AED 104. For example, if the user 102b leaves the first floor of the environment, the environment detector 310 may detect that the user 102b is closer to the secondary AED 103a (e.g., Smart Speaker2) and may prefer to have the secondary AED 103a perform a conflicting long standing operation issued by the user 102b. In response to receiving the home graph representing the current environment 316 from the environment detector 310, the compromise generator 350 may generate one or more additional compromise operations 354 that include fulfilling the conflicting queries 106, 146 on separate AEDs.

In some examples, the compromise generator 350 is configured with a change threshold and, when respective confidence scores of the one or more compromise solutions 354 satisfies the threshold (e.g., exceeds the threshold), the compromise generator 354 outputs the one or more compromise solutions 354 to the users 102. Here, the compromise generator 350 determines a respective confidence score associated with each compromise operation 354 among the multiple compromise operations 354, and selects the compromise operation 354 among the multiple compromise operations 354 as the compromise operation 354 having the highest respective confidence score. The threshold may be zero, where all compromise solutions 354 (e.g., even undesirable compromises) are output to the users 102. Conversely, the threshold may be higher than zero to avoid unnecessary compromise solutions 354 that are likely to be rejected by the users 102. Additionally, in some implementations, a compromise is not possible. For example, in an environment with only the single AED 104, performing the second query on a second AED would not be included in the compromise solutions 354. Similarly, the compromise generator 350 may determine that "heavy metal" and "soul" music cannot be combined, and therefore no compromise exists. In some implementations, instructing the digital assistant 105 to perform the compromise operation 354 is based on the respective confidence score associated with the selected compromise operation 354 satisfies the threshold. In other words, when the compromise generator 350 identifies multiple compromise solutions/operations 354 each with a respective confidence score, the compromise generator 350 may select the compromise operation 354 having the highest respective confidence score and/or provide a n-best list of compromise operations 354 for the users to select from. In some examples, the query handler 500 automatically performs a compromise operation 354 when the respective confidence score exceeds a threshold value, rather than prompting the users 102 to make a selection.

Referring again to FIG. 1B, after determining that the second query 146 was issued by another user 102b than the first user 102a that issued the first query 102a, and determining that performing the second long-standing operation 112 conflicts with the first long-standing operation 111, the query handler 300 identifies/generates the one or more compromise operations 354 for the digital assistant 105. As discussed above, the query handler (via the compromise generator 350) determines that the first query 106 (e.g., pop music) and the second query 146 (e.g., classical music) are similar enough to be combined, and generates the compromise operation 354a to play violin pop covers. Additionally, the query handler 300 identifies the AED 104 as a candidate for the digital assistant 105 to continue to perform the first long-standing operation 111 and a second AED 103 (e.g., the smart speaker 103a) to perform the second long-standing operation 112 simultaneously while the digital assistant 105 continues to perform the first long-standing operation 111 on the AED 104 as a compromise operation 354b. For example, the query handler 300 may obtain, from the home graph representing the current environment 316, proximity information 107 for at least two secondary AEDs 103 within the environment of the users 102a and 102b, and proximity information 54 for each of the first user 102a and the other user 102b. Here, identifying the AED 104 from the home graph as the candidate for the digital assistant 105 to perform the first long-standing operation 111 and the assistant-enabled device 103a from the home graph as the candidate for the digital assistant 105 to perform the second long-standing operation 112 simultaneously is based on the proximity information 107 for each of the AEDs 103a, 104 and the proximity information 54 for each of the first user 102a and the other user 102b In some implementations, the query handler 300 (via the digital assistant 105), presents the users 102a, 102b with the identified compromise operations 354a, 354b and prompts one or more of the users 102a, 102b to provide confirmation for the digital assistant 105 to perform a selected compromise operation 354. In these implementations, prompting the users 102 includes providing, as output from the AED 104, a user-selectable option that when selected provides positive confirmation for the digital assistant 105 to perform the selected compromise operation 354. For instance, the digital assistant 105 may generate synthesized speech 123 for audible output from the speaker 18 of the AED 104 (or a speaker in communication with the data processing hardware (e.g., a speaker of the user device 50)) that prompts the seed user 102a to instruct the digital assistant 105 to perform an identified compromise solution 354, "Barb, would you like to switch to violin pop covers, or play Canon in D on Smart Speaker2?". In response, the user 102a (i.e., Barb) is shown providing confirmation for the digital assistant to perform the compromise operation 354b by issuing a third query 148, "Play Canon in D on Smart Speaker2" in the vicinity of the AED 104. In response to receiving the positive confirmation from the user 102a, the digital assistant 105 performs the selected compromise operation 354b of playing the second long-standing operation 112 on the secondary AED 103a (i.e., smart speaker 2), while simultaneously performing the first long-standing operation 111 on the AED 104.

Additionally or alternatively to audibly prompting the users 102a, 102, as the digital assistant 105 may additionally provide a notification to the user device 50 associated with a user 102 to display user-selectable options for the one or more compromise solutions 354 as a graphical element 210 on the screen of the user device 50, the graphical element 210 prompting the user 102 to provide conformation for the digital assistant 105 to perform the compromise operations 354. As shown in FIG. 2B, the GUI 200b renders, for display, the graphical elements 210 "A conflict was detected, would you like a compromise?", "Play Violin Pop Covers" (i.e., compromise operation 354a) "Play Canon in D on Smart Speaker2" (i.e., compromise operation 354b), and "No" that allow the respective user 102 of the device to issue (or opt out from the opportunity to issue) the third query 148 instructing the digital assistant 105 to perform the compromise operation 354. Here, the query handler 300 receives positive confirmation from the user 102 for the digital assistant 105 to perform the compromise operation 354b when the user device 50 receives a user input indication indicating selection of the user selectable option selecting the graphical element 210 "Play Canon in D on Smart Speaker2."

Referring to FIG. 1C, the query handler 300 instructs the digital assistant 105 to perform the second long-standing operation 112 of playing music 122 as playback audio (e.g., Track #2) from the secondary AED 103a (i.e., the smart Speaker2) simultaneously while the digital assistant 105 is performing the first long-standing operation 111 of playing music 122 as playback audio (e.g., Track #1) on the AED 104. As shown, the user 102b has moved to the second floor of the environment to be closer to the requested long-standing operation 112 of playing Canon in D. In some examples, after instructing the digital assistant 105 to perform the second long-standing operation 112 on the secondary AED 103a, the query handler 300 instructs the digital assistant 105 to adjust performance of the first long-standing operation 111 on the AED 104. Here, the query handler 300 may instruct the digital assistant to lower the volume of the music 122 output by the AED 104 so that it does not interfere with the music 122 output by the secondary AED 103a. In other examples, where the long-standing operation includes two or more home automation device (e.g., the smart lightbulb 103b), the query handler 300 may instruct a first device to lower its brightness when a second device is turned on in an adjacent room to maintain a calm environment.

While the examples primarily refer to avoiding the interruption of the long-standing operation of playing music to, the long-standing operations may refer to any category of actions including, but not limited to, search queries, controls for assistant-enabled devices (e.g. smart lights, smart thermostats), and playing/adjusting other types of media (e.g., podcasts, videos, etc.), etc. For example, the query handler 300 may help users 102 in an environment create a shopping list by resolving conflicts between items on the shopping list by recommending items that all users 102 agree to. Moreover, the query handler 300 may enable the digital assistant 105 to mediate disagreements between users 102, by engaging/prompting the users 102 with compromises the users 102 may not have considered on their own.

Figure 6:
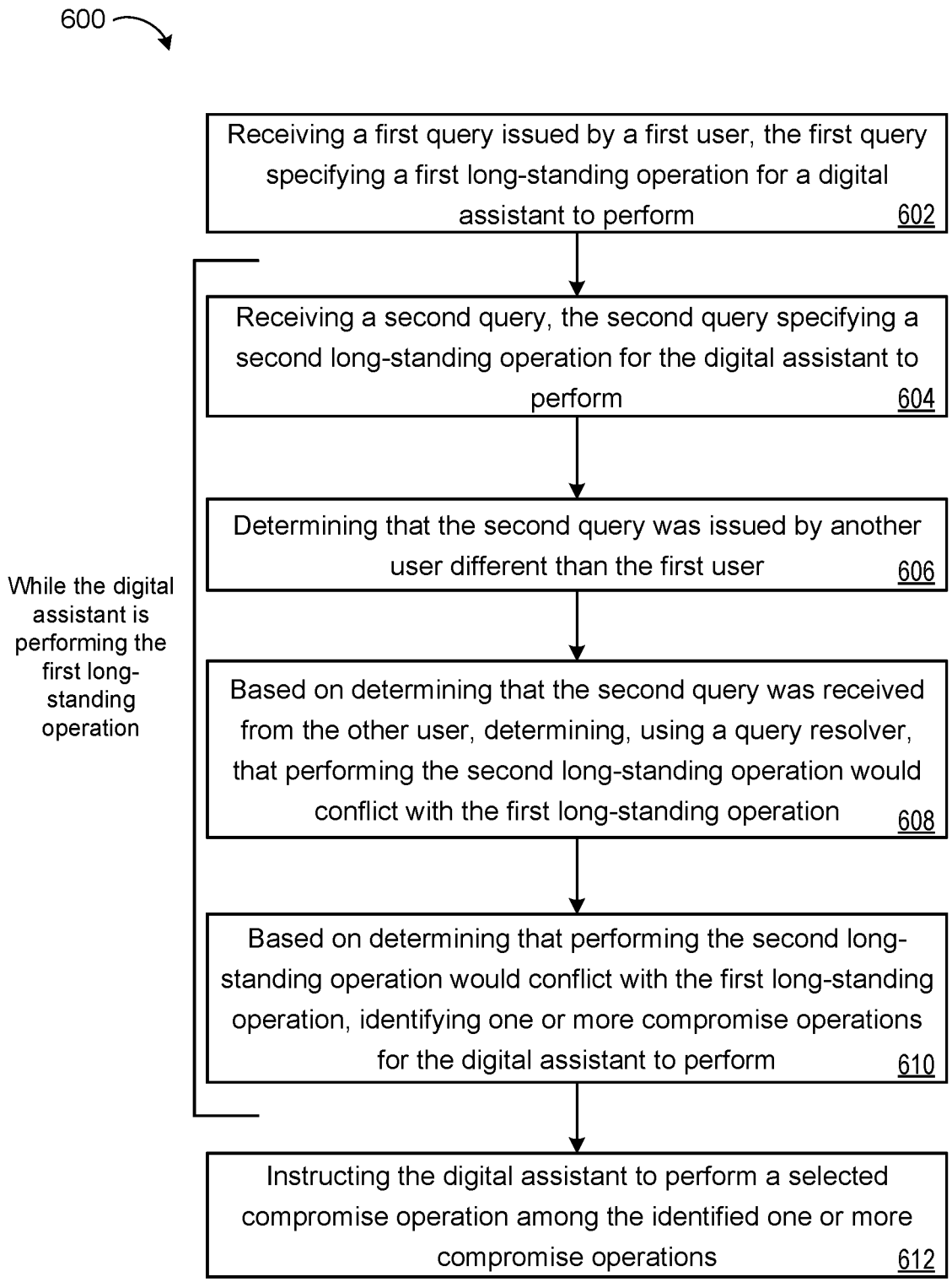
FIG. 6 is a flowchart of an example arrangement of operations for a method of handling voice queries in an environment with multiple users.

FIG. 6 includes a flowchart of an example arrangement of operations for a method 600 of handling contradictory queries on a shared device. At operation 602, the method 600 includes receiving a first query 106 issued by a first user 102a, the first query 106 specifying a first long-standing operation 111 for a digital assistant 105 to perform. While the digital assistant 105 is performing the first long-standing operation 111, the method 600 also includes, at operation 604, receiving a second query 146, the second query specifying a second long-standing operation 112 for the digital assistant 105 to perform.

At operation 606, the method 600 further includes determining whether the second query 146 was issued by another user 102b different than the first user 102a. Based on determining that the second query 146 was received from the other user 102b, the method 600 also includes, at operation 608, determining, using a query resolver 340, that performing the second long-standing operation 112 would conflict with the first long-standing operation 111. Based on determining that performing the second long-standing operation 112 would conflict with the first long-standing operation 111, the method 600 also includes, at operation 610, identifying one or more compromise operations 352 for the digital assistant 105 to perform. At operation 312, the method 600 also includes instructing the digital assistant 105 to perform a selected compromise operation 352 among the identified one or more compromise operations 352.

Figure 7:
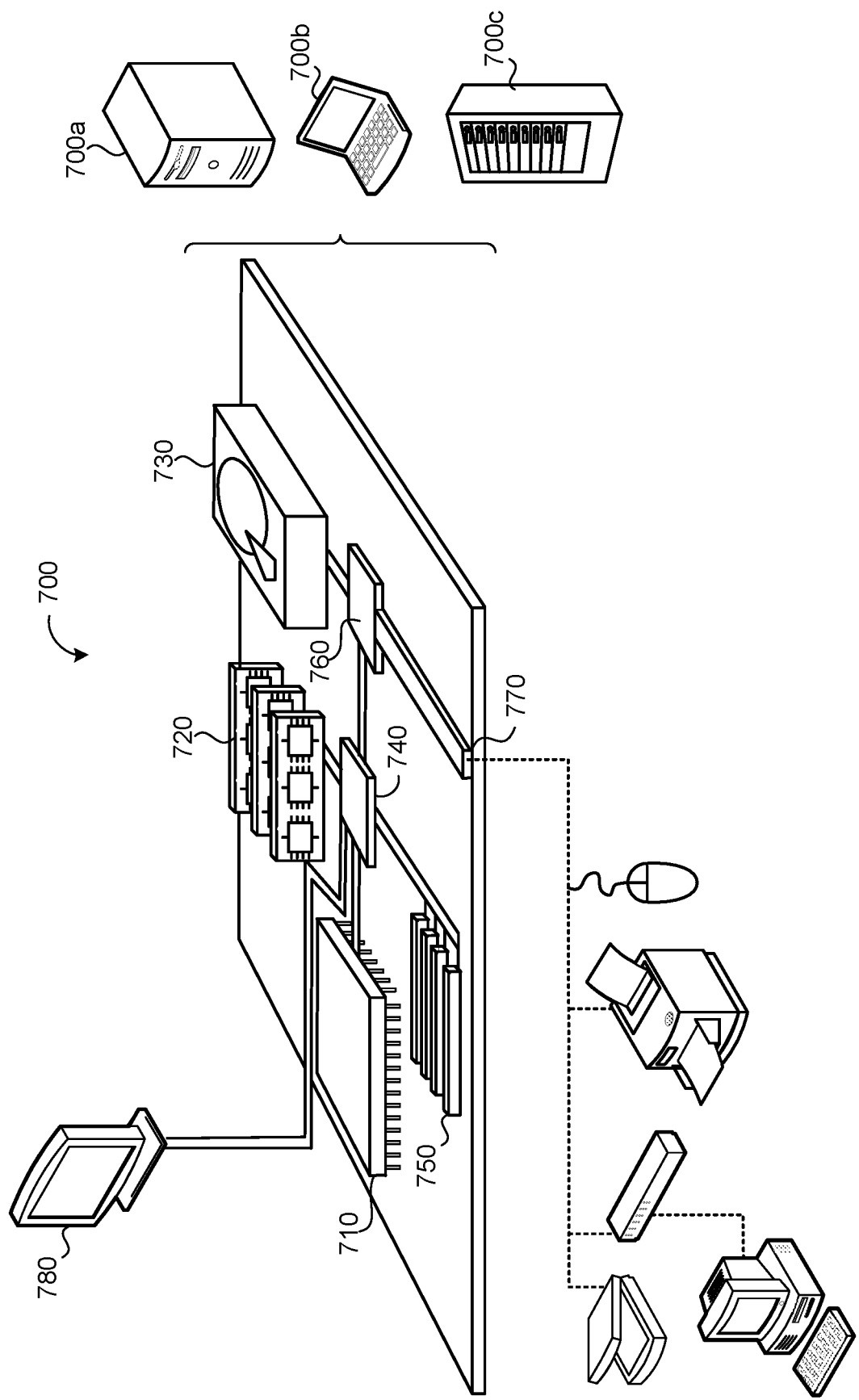
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 (e.g., the data processing hardware 10, 132 of FIG. 1) can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 (e.g., the memory hardware 12, 134 of FIG. 1) may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving a first query issued by a first user, the first query specifying a first long-standing operation for a digital assistant to perform, the first long-standing operation comprising playback of media content or a home automation setting; and
   while the digital assistant is performing the first long-standing operation on a first assistant-enabled device:
      receiving a second query, the second query specifying a second long-standing operation for the digital assistant to perform, the second long-standing operation comprising playback of media content or a home automation setting;
      determining that the second query was issued by another user different than the first user, the other user located in a same environment as the first user and the first assistant-enabled device;
      based on determining that the second query was received from the other user, determining, using a query resolver, that performing the second long-standing operation on the first assistant-enabled device would conflict with the first long-standing operation performing on the first assistant-enabled device;
      based on determining that performing the second long-standing operation on the first assistant-enabled device would conflict with the first long-standing operation performing on the first assistant-enabled device, identifying one or more compromise operations for the digital assistant to perform by:
         obtaining a home graph indicating a spatial proximity of each of one or more secondary assistant-enabled devices relative to the first assistant-enabled device, each of the one or more secondary assistant-enabled devices capable of performing the second long-standing operation and located in the same environment as the first assistant-enabled device, the first user, and the other user; and
         based on the spatial proximity of each of the one or more secondary assistant-enabled devices relative to the first assistant-enabled device, selecting, from the one or more secondary assistant-enabled devices, a second assistant-enabled device to perform the second long-standing operation simultaneously while the digital assistant performs the first long-standing operation on the first assistant-enabled device;
      instructing the digital assistant to perform the second long-standing operation on the second assistant-enabled device simultaneously while the digital assistant is performing the first long-standing operation on the first assistant-enabled device; and
      after instructing the digital assistant to perform the second long-standing operation on the second assistant-enabled device, instructing, based on the spatial proximity of the second assistant-enabled device relative to the first assistant-enabled device, the digital assistant to adjust a performance setting of the first assistant-enabled device so that the first long-standing operation performing on the first assistant-enabled device does not interfere with the second long-standing operation performing on the second assistant-enabled device.

2. The method of claim 1, wherein:
receiving the second query comprises receiving audio data corresponding to the second query, the second query spoken by the other user and captured by at least one of:
the first assistant-enabled device executing the digital assistant; or
the one or more secondary assistant-enabled devices; and
determining that the second query was issued by another user that is different than the first user comprises performing speaker identification on the audio data to determine that the second query was spoken by the other user that is different than the first user that issued the first query.

3. The method of claim 2, wherein performing speaker identification on the audio data to determine that the second query was spoken by the other user comprises:
extracting, from the audio data corresponding to the second query, a speaker-discriminative vector representing characteristics of the second query; and
determining that the speaker-discriminative vector extracted from the audio data corresponding to the second query at least one of:
does not match a reference speaker vector for the first user; or
matches an enrolled speaker vector associated with the other user.

4. The method of claim 1, wherein receiving the first query issued by the first user comprises receiving, from a user device associated with the first user, a user input indication indicating a user intent to issue the first query.

5. The method of claim 1, wherein receiving the first query issued by the first user comprises receiving audio data corresponding to the first query spoken by the first user and captured by the first assistant-enabled device executing the digital assistant.

6. The method of claim 1, wherein the operations further comprise:
receiving a third query, the third query specifying a third long-standing operation for the digital assistant to perform, the third long-standing operation comprising playback of media content or a home automation setting;
identifying criteria associated with the first query;
identifying criteria associated with the third query;
generating, using a query embedding model, a first query embedding based on the criteria associated with the first query;
generating, using the query embedding model, a third query embedding based on the criteria associated with the third query;
determining a combined embedding based on the first query embedding and the third query embedding; and
identifying at least one compromise operation that maps to the combined embedding in an embedding space.

7. The method of claim 6, wherein:
the identified criteria associated with the first query comprises a first preference of a type of media content for playback from the first assistant-enabled device executing the digital assistant;
the identified criteria associated with the third query comprises a second preference of the type of the media content for playback from the first assistant-enabled device; and
the identified at least one compromise operation comprises a third preference of the type of media content for playback from the first assistant-enabled device.

8. The method of claim 7, wherein:
the type of media content comprises music;
the first preference of the type of the media content comprises a first genre of music; and
the second preference of the type of the media content comprises a second genre of music.

9. The method of claim 6, wherein:
the first assistant-enabled device comprises a home automation device;
the identified criteria associated with the first query comprises a first value for a setting of the home automation device;
the identified criteria associated with the third query comprises a second value for the setting of the home automation device; and
the identified at least one compromise operation comprises adjusting the first value for the setting of the home automation device to a new value.

10. The method of claim 9, wherein the home automation device comprises a smart thermostat, a smart light, a smart speaker, or a smart display.

11. The method of claim 1, wherein the operations further comprise:
obtaining proximity information for each of the first user that issued the first query and the other user that issued the second query,
wherein selecting, from the one or more secondary assistant-enabled devices, the second assistant-enabled device to perform the second long-standing operation simultaneously while the digital assistant performs the first long-standing operation on the first assistant-enabled device is further based on the proximity information for each of the first user that issued the first query and the other user that issued the second query.

12. The method of claim 1, wherein the operations further comprise, after instructing the digital assistant to perform the second long-standing operation on the second assistant-enabled device, instructing the digital assistant to adjust performance of the second long-standing operation on the second assistant-enabled device.

13. The method of claim 1, wherein the operations further comprise:
prompting the first user and/or the other user to provide confirmation for the digital assistant to perform the second long-standing operation on the second assistant-enabled device; and
receiving positive confirmation from the first user and/or the other user for the digital assistant to perform the second long-standing operation on the second assistant-enabled device,
wherein instructing the digital assistant to perform the second long-standing operation on the second assistant-enabled device is based on the received positive confirmation.

14. A system comprising:
data processing hardware; and
memory hardware in communication with the data processing hardware, the memory hardware storing instructions that when executed on the data processing hardware cause the data processing hardware to perform operations comprising:
receiving a first query issued by a first user, the first query specifying a first long-standing operation for a digital assistant to perform, the first long-standing operation comprising playback of media content or a home automation setting; and while the digital assistant is performing the first long-standing operation on a first assistant-enabled device:
  receiving a second query, the second query specifying a second long-standing operation for the digital assistant to perform, the second long-standing operation comprising playback of media content or a home automation setting;
  determining that the second query was issued by another user different than the first user, the other user located in a same environment as the first user and the first assistant-enabled device;
  based on determining that the second query was received from the other user, determining, using a query resolver, that performing the second long-standing operation on the first assistant-enabled device would conflict with the first long-standing operation performing on the first assistant-enabled device;
  based on determining that performing the second long-standing operation on the first assistant-enabled device would conflict with the first long-standing operation performing on the first assistant-enabled device, identifying one or more compromise operations for the digital assistant to perform by:
    obtaining a home graph indicating a spatial proximity of each of one or more secondary assistant-enabled devices relative to the first assistant-enabled device, each of the one or more secondary assistant-enabled devices capable of performing the second long-standing operation and located in the same environment as the first assistant-enabled device, the first user, and the other user; and
    based on the spatial proximity of each of the one or more secondary assistant-enabled devices relative to the first assistant-enabled device, selecting, from the one or more secondary assistant-enabled devices, a second assistant-enabled device to perform the second long-standing operation simultaneously while the digital assistant performs the first long-standing operation on the first assistant-enabled device;
  instructing the digital assistant to perform the second long-standing operation on the second assistant-enabled device simultaneously while the digital assistant is performing the first long-standing operation on the first assistant-enabled device; and
  after instructing the digital assistant to perform the second long-standing operation on the second assistant-enabled device, instructing, based on the spatial proximity of the second assistant-enabled device relative to the first assistant-enabled device, the digital assistant to adjust a performance setting of the first assistant-enabled device so that the first long-standing operation performing on the first assistant-enabled device does not interfere with the second long-standing operation performing on the second assistant-enabled device.

15. The system of claim 14, wherein:
receiving the second query comprises receiving audio data corresponding to the second query, the second query spoken by the other user and captured by at least one of:
  the first assistant-enabled device executing the digital assistant; or
  the one or more secondary assistant-enabled devices; and
determining that the second query was issued by another user that is different than the first user comprises performing speaker identification on the audio data to determine that the second query was spoken by the other user that is different than the first user that issued the first query.

16. The system of claim 15, wherein performing speaker identification on the audio data to determine that the second query was spoken by the other user comprises:
  extracting, from the audio data corresponding to the second query, a speaker-discriminative vector representing characteristics of the second query; and
  determining that the speaker-discriminative vector extracted from the audio data corresponding to the second query at least one of:
    does not match a reference speaker vector for the first user; or
    matches an enrolled speaker vector associated with the other user.

17. The system of claim 14, wherein receiving the first query issued by the first user comprises receiving, from a user device associated with the first user, a user input indication indicating a user intent to issue the first query.

18. The system of claim 14, wherein receiving the first query issued by the first user comprises receiving audio data corresponding to the first query spoken by the first user and captured by the first assistant-enabled device executing the digital assistant.

19. The system of claim 14, wherein the operations further comprise:
  receiving a third query, the third query specifying a third long-standing operation for the digital assistant to perform, the third long-standing operation comprising playback of media content or a home automation setting;
  identifying criteria associated with the first query;
  identifying criteria associated with the third query;
  generating, using a query embedding model, a first query embedding based on the criteria associated with the first query;
  generating, using the query embedding model, a third query embedding based on the criteria associated with the third query;
  determining a combined embedding based on the first query embedding and the third query embedding; and
  identifying at least one compromise operation that maps to the combined embedding in an embedding space.

20. The system of claim 19, wherein
the identified criteria associated with the first query comprises a first preference of a type of media content for playback from the first assistant-enabled device executing the digital assistant;
the identified criteria associated with the third query comprises a second preference of the type of the media content for playback from the first assistant-enabled device; and
the identified at least one compromise operation comprises a third preference of the type of media content for playback from the first assistant-enabled device.

21. The system of claim 20, wherein:
the type of media content comprises music;
the first preference of the type of the media content comprises a first genre of music; and the second preference of the type of the media content comprises a second genre of music.

22. The system of claim 19, wherein:
the first assistant-enabled device comprises a home automation device;
the identified criteria associated with the first query comprises a first value for a setting of the home automation device;
the identified criteria associated with the third query comprises a second value for the setting of the home automation device; and
the identified at least one compromise operation comprises adjusting the first value for the setting of the home automation device to a new value.

23. The system of claim 22, wherein the home automation device comprises a smart thermostat, a smart light, a smart speaker, or a smart display.

24. The system of claim 14, wherein the operations further comprise:
obtaining proximity information for each of the first user that issued the first query and the other user that issued the second query,
wherein selecting, from the one or more secondary assistant-enabled devices, the second assistant-enabled device to perform the second long-standing operation simultaneously while the digital assistant performs the first long-standing operation on the first assistant-enabled device is further based on the proximity information for each of the first user that issued the first query and the other user that issued the second query.

25. The system of claim 14, wherein the operations further comprise, after instructing the digital assistant to perform the second long-standing operation on the second assistant-enabled device, instructing the digital assistant to adjust performance of the second long-standing operation on the second assistant-enabled device.

26. The system of claim 14, wherein the operations further comprise:
prompting the first user and/or the other user to provide confirmation for the digital assistant to perform the second long-standing operation on the second assistant-enabled device; and
receiving positive confirmation from the first user and/or the other user for the digital assistant to perform the second long-standing operation on the second assistant-enabled device,
wherein instructing the digital assistant to perform the second long-standing operation on the second assistant-enabled device is based on the received positive confirmation.

* * * * *